(12) United States Patent
Imai et al.

(10) Patent No.: US 12,735,609 B2
(45) Date of Patent: Sep. 15, 2026

(54) PRESSURE-SENSITIVE ADHESIVE COMPOSITION FOR PATTERNED PRESSURE-SENSITIVE ADHESIVE TAPE, PATTERNED PRESSURE-SENSITIVE ADHESIVE TAPE, AND PRODUCTION METHOD THEREOF

(71) Applicant: DIC Corporation, Tokyo (JP)

(72) Inventors: Katsuaki Imai, Saitama (JP); Kenji Nakamura, Chiba (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 18/448,356

(22) Filed: Aug. 11, 2023

(65) Prior Publication Data

US 2024/0052211 A1 Feb. 15, 2024

(30) Foreign Application Priority Data

Aug. 12, 2022 (JP) ................................ 2022-128832
Aug. 12, 2022 (JP) ................................ 2022-128840

(51) Int. Cl.
*C09J 7/38* (2018.01)
*C08F 220/18* (2006.01)
*C09J 133/08* (2006.01)

(52) U.S. Cl.
CPC ......... *C09J 7/385* (2018.01); *C08F 220/1804* (2020.02); *C09J 133/08* (2013.01); *C09J 2301/10* (2020.08); *C09J 2433/00* (2013.01)

(58) Field of Classification Search
None
See application file for complete search history.

(56) References Cited

U.S. PATENT DOCUMENTS 6,074,745 A * 6/2000 Speeney .................... C09J 7/20 427/208.4
6,344,260 B1 * 2/2002 Lythgoe .................. B41M 3/12 428/354

(Continued)

FOREIGN PATENT DOCUMENTS

JP 2007-169327 A 7/2007
JP 2017179297 A * 10/2017 ........... C09J 121/00

OTHER PUBLICATIONS

JP2017179297 Machine Translation via EPO (Year: 2017).*

*Primary Examiner* — Laura C Powers
(74) *Attorney, Agent, or Firm* — Osha Bergman Watanabe & Burton LLP

(57) ABSTRACT

A patterned pressure-sensitive adhesive tape includes a pressure-sensitive adhesive layer. The pressure-sensitive adhesive layer is formed by a pressure-sensitive adhesive composition for patterned pressure-sensitive adhesive tape. An elongational viscosity of the pressure-sensitive adhesive composition measured at 30° C. is 1,000 mPa·s or greater and 650,000 mPa·s or less, or a Trouton's ratio thereof measured at 30° C. is 8 or greater and 400 or less. The pressure-sensitive adhesive layer has two or more pressure-sensitive adhesive portions (B) and a non-pressure-sensitive adhesive portion region having no pressure-sensitive adhesive portions (B) between the two or more pressure-sensitive adhesive portions (B). The non-pressure-sensitive adhesive portion region is patterned to lead to an outer periphery of a sheet plane.

20 Claims, 2 Drawing Sheets

(56) References Cited

U.S. PATENT DOCUMENTS

| | | | | |
|---|---|---|---|---|
| 2006/0165936 | A1* | 7/2006 | Kasahara | C09J 153/00 428/40.1 |
| 2009/0162595 | A1* | 6/2009 | Ko | B05C 9/06 118/313 |
| 2009/0291279 | A1* | 11/2009 | Schroeer | C09J 7/38 428/323 |

* cited by examiner

PRESSURE-SENSITIVE ADHESIVE COMPOSITION FOR PATTERNED PRESSURE-SENSITIVE ADHESIVE TAPE, PATTERNED PRESSURE-SENSITIVE ADHESIVE TAPE, AND PRODUCTION METHOD THEREOF

BACKGROUND

1. Field of the Invention

One or more embodiments of the present invention relate to a pressure-sensitive adhesive composition for patterned pressure-sensitive adhesive tape, patterned pressure-sensitive adhesive tape, and a production method thereof.

2. Description of the Related Art

Pressure-sensitive adhesive tape has excellent workability and high adhesion reliability and thus has been widely used in the field of producing electronic equipment, for example, OA equipment or home appliances.

In recent years, the electronic equipment has been required to have high functions, a reduced size, and a reduced thickness, and particularly portable electronic terminals such as personal computers, digital video cameras, electronic notebooks, mobile phones, PHS, smart phones, game machines, and electronic books have been required to have a further reduced size and a further reduced thickness. Along with the requirements, pressure-sensitive adhesive tape and the like constituting the portable electronic terminals have been required to have a reduced thickness.

As the pressure-sensitive adhesive tape with a reduced thickness, double-sided patterned pressure-sensitive adhesive tape including, on both surfaces of a core material, an acrylic acid ester-based copolymer having a weight-average molecular weight of 700,000 or greater and 90% by mass or greater of an acrylic acid butyl unit, and a pressure-sensitive adhesive layer using a viscosity imparting agent as a main component and containing 40% to 60% by mass of the viscosity imparting agent, in which the total thickness of the core material and the pressure-sensitive adhesive layers on both surfaces of the core material is 30 μm or less, and the thickness of each of the pressure-sensitive adhesive layers on both surfaces of the core material is in a range of 2 to 10 μm is known (for example, see Japanese Unexamined Patent Application Publication No. 2007-169327).

Further, when the pressure-sensitive adhesive tape with a reduced thickness is bonded to an adherend, air bubbles are likely to remain at the interface therebetween, and as a result, swelling or the like of the pressure-sensitive adhesive tape may cause appearance defects.

Further, in a case where the pressure-sensitive adhesive tape with a reduced thickness is used for bonding a heat dissipation member and a heat generation member to each other, since the remaining air bubbles have heat resistance, the heat dissipation properties may be degraded.

Further, under the circumstances that reduction of the thickness of the pressure-sensitive adhesive layer is also examined to realize the reduction of the thickness described above, adhesive strength sufficient for practical use cannot be maintained in some cases with the pressure-sensitive adhesive layer with a reduced thickness and simply provided with an escape route for air bubbles.

SUMMARY

One or more embodiments of the present invention provide patterned pressure-sensitive adhesive tape with excellent adhesive strength, which is capable of quickly releasing air bubbles from an interface with an adherend and preventing air bubbles from remaining at the interface.

The present disclosure includes the following embodiments.

[1] A pressure-sensitive adhesive composition for patterned pressure-sensitive adhesive tape, which is used for forming patterned pressure-sensitive adhesive tape, in which an elongational viscosity of the pressure-sensitive adhesive composition for patterned pressure-sensitive adhesive tape measured at 30° C. is 1,000 mPa·s or greater and 650,000 mPa·s or less, the patterned pressure-sensitive adhesive tape includes a pressure-sensitive adhesive layer, the pressure-sensitive adhesive layer has two or more pressure-sensitive adhesive portions (B) and a non-pressure-sensitive adhesive portion region having no pressure-sensitive adhesive portions (B) between the two or more pressure-sensitive adhesive portions (B), and the non-pressure-sensitive adhesive portion region is patterned to lead to an outer periphery of a sheet plane.

[2] A pressure-sensitive adhesive composition for patterned pressure-sensitive adhesive tape, which is used for forming patterned pressure-sensitive adhesive tape, in which a Trouton's ratio of the pressure-sensitive adhesive composition for patterned pressure-sensitive adhesive tape measured at 30° C. is 8 or greater and 400 or less, the patterned pressure-sensitive adhesive tape includes a pressure-sensitive adhesive layer, the pressure-sensitive adhesive layer has two or more pressure-sensitive adhesive portions (B) and a non-pressure-sensitive adhesive portion region having no pressure-sensitive adhesive portions (B) between the two or more pressure-sensitive adhesive portions (B), and the non-pressure-sensitive adhesive portion region is patterned to lead to an outer periphery of a sheet plane.

[3] Patterned pressure-sensitive adhesive tape including: a support (A); and a pressure-sensitive adhesive layer, in which the pressure-sensitive adhesive layer is formed by using the pressure-sensitive adhesive composition for patterned pressure-sensitive adhesive tape according to [1] or [2], the pressure-sensitive adhesive layer has two or more pressure-sensitive adhesive portions (B) and a non-pressure-sensitive adhesive portion region having no pressure-sensitive adhesive portions (B) between the two or more pressure-sensitive adhesive portions (B), and the non-pressure-sensitive adhesive portion region is patterned to lead to an outer periphery of a sheet plane.

[4] The patterned pressure-sensitive adhesive tape according to [3], in which the pressure-sensitive adhesive portions (B) when observed from a side of one surface (a) of the support (A) have a substantially circular shape, a substantially quadrilateral shape, or a substantially hexagonal shape.

[5] The patterned pressure-sensitive adhesive tape according to [3] or [4], in which a distance between any pressure-sensitive adhesive portion (b1) selected from the two or more pressure-sensitive adhesive portions (B) and a pressure-sensitive adhesive portion (b2) adjacent to the pressure-sensitive adhesive portion (b1) is 0.5 mm or less.

[6] The patterned pressure-sensitive adhesive tape according to [3] or [4], in which a proportion of a region having the pressure-sensitive adhesive portions (B) in an area of the one surface (a) of the support (A) is in a range of 10% to 99%.

[7] The patterned pressure-sensitive adhesive tape according to [3] or [4], in which a 180° peel adhesion strength measured using a test piece obtained by placing a smooth stainless steel plate on a surface having the pressure-sensitive adhesive portions (B), reciprocating a 2 Kg roller once to pressure-bond the surface and the stainless steel plate to each other, and allowing the surface and the stainless steel plate to stand one hour under conditions of 23° C. and 50% RH is in a range of 1 N/20 mm to 12 N/20 mm.

[8] A method of producing patterned pressure-sensitive adhesive tape, including: a pressure-sensitive adhesive layer forming step of forming a pressure-sensitive adhesive layer on a surface of a support (A) using the pressure-sensitive adhesive composition for patterned pressure-sensitive adhesive tape according to [1] or [2], in which the pressure-sensitive adhesive layer has two or more pressure-sensitive adhesive portions (B) and a non-pressure-sensitive adhesive portion region having no pressure-sensitive adhesive portions (B) between the two or more pressure-sensitive adhesive portions (B).

[9] The method of producing patterned pressure-sensitive adhesive tape according to [8], in which in the pressure-sensitive adhesive layer forming step, two or more of the pressure-sensitive adhesive portions (B) having a substantially circular shape, a substantially quadrilateral shape, or a substantially hexagonal shape are formed by coating at least one surface of the support (A) with the pressure-sensitive adhesive composition for patterned pressure-sensitive adhesive tape using a gravure printing method or a screen printing method.

patterned pressure-sensitive adhesive tape with excellent adhesive strength, which is capable of quickly releasing air bubbles from an interface with an adherend and preventing air bubbles from remaining at the interface.

DETAILED DESCRIPTION OF THE EMBODIMENTS

Figure 1:
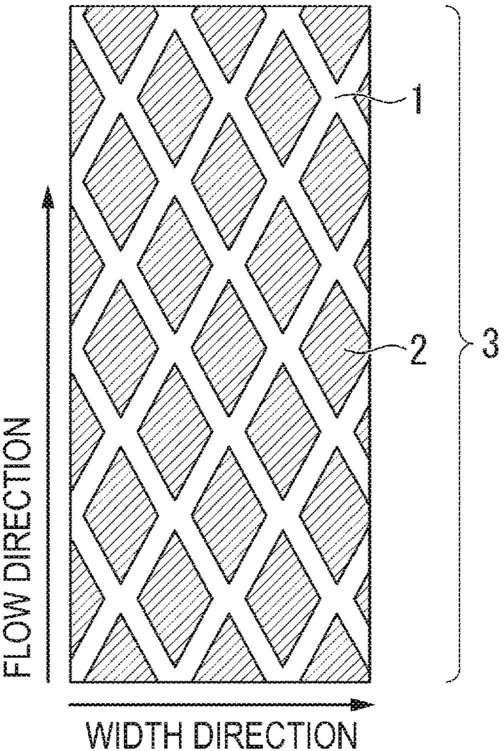
FIG. 1 is a top view showing patterned pressure-sensitive adhesive tape that has pressure-sensitive adhesive portions in a substantially rhombus shape when viewed from a side of the pressure-sensitive adhesive portions.

Pressure-Sensitive Adhesive Composition for Patterned Pressure-Sensitive Adhesive Tape A pressure-sensitive adhesive composition for patterned pressure-sensitive adhesive tape according to one or more embodiments of the present invention (also referred to as the pressure-sensitive adhesive composition according to one or more embodiments) is used for forming patterned pressure-sensitive adhesive tape described below.

The patterned pressure-sensitive adhesive tape includes a pressure-sensitive adhesive layer, the pressure-sensitive adhesive layer has two or more pressure-sensitive adhesive portions (B) and a non-pressure-sensitive adhesive portion region having no pressure-sensitive adhesive portions (B) between the two or more pressure-sensitive adhesive portions (B), and the non-pressure-sensitive adhesive portion region is patterned to lead to an outer periphery of a sheet plane.

According to an aspect, the elongational viscosity of the pressure-sensitive adhesive composition according to one or more embodiments, measured at 30° C. is 1,000 mPa·s or greater and 650,000 mPa·s or less.

The patterned pressure-sensitive adhesive tape is required such that the non-pressure-sensitive adhesive portion region serving as a flow path through which air bubbles are released is not blocked due to deformation or the like of the pressure-sensitive adhesive portions (B) in order to quickly release air bubbles from the interface between the patterned pressure-sensitive adhesive tape and the adherend and to make air bubbles difficult to remain at the interface. In addition, the patterned pressure-sensitive adhesive tape is required such that the pressure-sensitive adhesive portions are formed with stabilized dimensions and a sufficient adhesion area is obtained by the pressure-sensitive adhesive portions in order for the pressure-sensitive adhesive tape to exhibit excellent adhesive strength.

When the elongational viscosity of the pressure-sensitive adhesive composition according to one or more embodiments in a case of being measured at 30° C. is set to be in a predetermined range, it is possible to prevent the non-pressure-sensitive adhesive portion region from being blocked due to the pressure-sensitive adhesive composition in the formation of the pressure-sensitive adhesive portions. Further, the pressure-sensitive adhesive portions with satisfactory shape accuracy and shape holding properties can be formed. In this manner, the patterned pressure-sensitive adhesive tape formed by using the pressure-sensitive adhesive composition according to one or more embodiments is capable of achieving both satisfactory air bubble release and satisfactory adhesive strength.

Further, according to an aspect, the Trouton's ratio of the pressure-sensitive adhesive composition according to one or more embodiments in a case of being measured at 30° C. is 8 or greater and 400 or less.

The patterned pressure-sensitive adhesive tape is required such that the non-pressure-sensitive adhesive portion region serving as a flow path through which air bubbles are released is not blocked due to deformation or the like of the pressure-sensitive adhesive portions (B) in order to quickly release air bubbles from the interface between the patterned pressure-sensitive adhesive tape and the adherend and to make air bubbles difficult to remain at the interface. In addition, the patterned pressure-sensitive adhesive tape is required such that the pressure-sensitive adhesive portions are formed with stabilized dimensions and a sufficient adhesion area is obtained by the pressure-sensitive adhesive portions in order for the pressure-sensitive adhesive tape to exhibit excellent adhesive strength.

When the Trouton's ratio of the pressure-sensitive adhesive composition according to one or more embodiments in a case of being measured at 30° C. is set to be in a predetermined range, it is possible to prevent the non-pressure-sensitive adhesive portion region from being blocked due to the pressure-sensitive adhesive composition in the formation of the pressure-sensitive adhesive portions. Further, the pressure-sensitive adhesive portions with satisfactory shape accuracy and shape holding properties can be formed. In this manner, the patterned pressure-sensitive adhesive tape formed by using the pressure-sensitive adhesive composition according to one or more embodiments is capable of achieving both satisfactory air bubble release and satisfactory adhesive strength.

The elongational viscosity of the pressure-sensitive adhesive composition according to one or more embodiments in a case of being measured at 30° C. may be 1,000 mPa·s or greater and 650,000 mPa·s or less, 10,000 mPa·s or greater and 450,000 mPa·s or less, or 50,000 mPa·s or greater and 350,000 mPa·s or less.

The pressure-sensitive adhesive portions with satisfactory shape accuracy and shape holding properties can be formed by using the pressure-sensitive adhesive composition according to one or more embodiments in which the elongational viscosity of the pressure-sensitive adhesive composition measured at 30° C. in the formation of the patterned pressure-sensitive adhesive tape is 1,000 mPa·s or greater. Particularly, when the pressure-sensitive adhesive portions are formed by various printing methods, the transferability of the pressure-sensitive adhesive composition from a printing plate and the shape holding properties of the pressure-sensitive adhesive portions after transfer are excellent. The pressure-sensitive adhesive portions with satisfactory shape accuracy can be formed regardless of the kind of the printing method of applying a pressure-sensitive adhesive composition, by using the pressure-sensitive adhesive composition according to one or more embodiments in which the elongational viscosity of the pressure-sensitive adhesive composition measured at 30° C. in the formation of the patterned pressure-sensitive adhesive tape is 650,000 mPa·s or less. Particularly, when the pressure-sensitive adhesive portions are formed by using a printing plate, pressure-sensitive adhesive portions with less errors in the shape and dimensions of the pressure-sensitive adhesive portions transferred and formed by dots on the plate with respect to the shape and dimensions of the dots on the plate can be easily formed.

When the method of applying the pressure-sensitive adhesive composition according to one or more embodiments is a gravure printing method in the method of producing the patterned pressure-sensitive adhesive tape described below, the elongational viscosity of the pressure-sensitive adhesive composition measured at 30° C. may be 1,000 mPa·s or greater and 650,000 mPa·s or less, 1,000 mPa·s or greater and 500,000 mPa·s or less, 1,000 mPa·s or greater and 75,000 mPa·s or less, or 1,300 mPa·s or greater and 20,000 mPa·s or less.

When the elongational viscosity of the pressure-sensitive adhesive composition used in the gravure printing method is set to be in the above-described ranges, the pressure-sensitive adhesive composition easily flows out from recesses of a gravure plate corresponding to the pressure-sensitive adhesive portions, and thus the pressure-sensitive adhesive composition can be easily transferred to a support or a release liner. Further, the shape holding properties and the dimensional accuracy of the pressure-sensitive adhesive portions (pressure-sensitive adhesive portions after transfer) formed by transferring the pressure-sensitive adhesive composition to a support or the like are excellent.

When the method of applying the pressure-sensitive adhesive composition according to one or more embodiments is a screen printing method in the method of producing the patterned pressure-sensitive adhesive tape described below, the elongational viscosity of the pressure-sensitive adhesive composition measured at 30° C. may be 1,000 mPa·s or greater and 650,000 mPa·s or less, 50,000 mPa·s or greater and 650,000 mPa·s or less, or 100,000 mPa·s or greater and 650,000 mPa·s or less.

When the elongational viscosity of the pressure-sensitive adhesive composition used in the screen printing method is set to be in the above-described ranges, the pressure-sensitive adhesive composition can be maintained in holes of a screen plate corresponding to the pressure-sensitive adhesive portions, the pressure-sensitive adhesive composition easily flows out from the holes during transfer, and thus the pressure-sensitive adhesive composition can be easily transferred to a support or a release liner. Further, the shape holding properties and the dimensional accuracy of the pressure-sensitive adhesive portions after the transfer are excellent.

The Trouton's ratio of the pressure-sensitive adhesive composition according to one or more embodiments in a case of being measured at 30° C. may be 8 or greater and 400 or less, 25 or greater and 375 or less, or 100 or greater and 350 or less.

The pressure-sensitive adhesive portions with satisfactory shape accuracy and shape holding properties can be formed by using the pressure-sensitive adhesive composition according to one or more embodiments in which the Trouton's ratio of the pressure-sensitive adhesive composition measured at 30° C. in the formation of the patterned pressure-sensitive adhesive tape is 8 or greater. Particularly, when the pressure-sensitive adhesive portions are formed by various printing methods, the transferability of the pressure-sensitive adhesive composition from a printing plate and the shape holding properties of the pressure-sensitive adhesive portions after transfer are excellent. The pressure-sensitive adhesive portions with satisfactory shape accuracy can be formed regardless of the kind of the printing method of applying a pressure-sensitive adhesive composition, by using the pressure-sensitive adhesive composition according to one or more embodiments in which the Trouton's ratio of the pressure-sensitive adhesive composition measured at 30° C. in the formation of the patterned pressure-sensitive adhesive tape is 400 or less. Particularly, when the pressure-sensitive adhesive portions are formed by using a printing plate, pressure-sensitive adhesive portions with less errors in the shape and dimensions of the pressure-sensitive adhesive portions transferred and formed by dots on the plate with respect to the shape and dimensions of the dots on the plate can be easily formed.

When the method of applying the pressure-sensitive adhesive composition according to one or more embodiments is the gravure printing method in the method of producing the patterned pressure-sensitive adhesive tape described below, the Trouton's ratio of the pressure-sensitive adhesive composition measured at 30° C. may be 8 or greater and 400 mPa·s or less, 8 or greater and 333 or less, 8 or greater and 144 mPa·s or less, or 9.3 or greater and 100 or less.

When the Trouton's ratio of the pressure-sensitive adhesive composition used in the gravure printing method is set to be in the above-described ranges, the pressure-sensitive adhesive composition easily flows out from recesses of a gravure plate corresponding to the pressure-sensitive adhesive portions, and thus the pressure-sensitive adhesive composition can be easily transferred to a support or a release liner. Further, the shape holding properties and the dimensional accuracy of the pressure-sensitive adhesive portions after the transfer are excellent.

When the method of applying the pressure-sensitive adhesive composition according to one or more embodiments is the screen printing method in the method of producing the patterned pressure-sensitive adhesive tape described below, the Trouton's ratio of the pressure-sensitive adhesive composition measured at 30° C. may be 8 or greater and 400 or less, 160 or greater and 400 or less, 200 or greater and 400 or less, or 250 or greater and 400 or less.

When the Trouton's ratio of the pressure-sensitive adhesive composition used in the screen printing method is set to be in the above-described ranges, the pressure-sensitive adhesive composition can be maintained in holes of a screen plate corresponding to the pressure-sensitive adhesive portions, the pressure-sensitive adhesive composition easily flows out from the holes during transfer, and thus the pressure-sensitive adhesive composition can be easily transferred to a support or a release liner. Further, the shape holding properties and the dimensional accuracy of the pressure-sensitive adhesive portions after the transfer are excellent.

The pressure-sensitive adhesive composition according to one or more embodiments satisfies at least one of the above-described ranges of the elongational viscosity or the above-described ranges of the Trouton's ratio. Here, it is more preferable that the pressure-sensitive adhesive composition according to one or more embodiments satisfy the above-described ranges of the elongational viscosity and also satisfy the above-described ranges of the Trouton's ratio.

Examples of the pressure-sensitive adhesive composition according to one or more embodiments include known pressure-sensitive adhesive compositions such as an acrylic pressure-sensitive adhesive composition, a rubber-based pressure-sensitive adhesive composition, a silicone-based pressure-sensitive adhesive composition, a urethane-based pressure-sensitive adhesive composition, a polyester-based pressure-sensitive adhesive composition, a styrene-diene block copolymer-based pressure-sensitive adhesive composition, a vinyl alkyl ether-based pressure-sensitive adhesive composition, a polyamide-based pressure-sensitive adhesive composition, a fluorine-based pressure-sensitive adhesive composition, a creep characteristic improved pressure-sensitive adhesive composition, and a radiation curable pressure-sensitive adhesive composition. Among these, from the viewpoint that the patterned pressure-sensitive adhesive tape formed by using an acrylic pressure-sensitive adhesive composition has excellent adhesion reliability, an acrylic pressure-sensitive adhesive composition is preferable as the pressure-sensitive adhesive composition according to one or more embodiments.

Acrylic Pressure-Sensitive Adhesive Composition

An acrylic pressure-sensitive adhesive composition containing an acrylic polymer can be used as the acrylic pressure-sensitive adhesive composition.

Acrylic Polymer

An acrylic polymer obtained by polymerizing a monomer component containing a (meth)acrylic monomer such as (meth)acrylic acid alkyl ester can be used as the acrylic polymer.

As the (meth)acrylic acid alkyl ester, for example, methyl (meth)acrylate, ethyl (meth)acrylate, propyl (meth)acrylate, isopropyl (meth)acrylate, butyl (meth)acrylate, isobutyl (meth)acrylate, s-butyl (meth)acrylate, t-butyl (meth)acrylate, pentyl (meth)acrylate, hexyl (meth)acrylate, cyclohexyl (meth)acrylate, heptyl (meth)acrylate, octyl (meth)acrylate, 2-ethylhexyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, dodecyl (meth)acrylate, tridecyl (meth)acrylate, tetradecyl (meth)acrylate, pentadecyl (meth)acrylate, hexadecyl (meth)acrylate, heptadecyl (meth)acrylate, octadecyl (meth) acrylate, nonadecyl (meth)acrylate, and eicosyl (meth)acrylate can be used alone or in combination of two or more kinds thereof. Among these, as the (meth)acrylic acid alkyl ester, (meth)acrylic acid alkyl ester containing an alkyl group with 1 to 20 carbon atoms may be used, and (meth) acrylic acid alkyl ester having an alkyl group with 4 to 18 carbon atoms may be used. Examples of the alkyl group include a linear or branched alkyl group.

Butyl (meth)acrylate may be used as the (meth)acrylic acid alkyl ester having an alkyl group with 4 to 18 carbon atoms from the viewpoint that the surface shape (surface shape of the pressure-sensitive adhesive portions) of the pressure-sensitive adhesive layer is likely to be maintained. Thus, patterned pressure-sensitive adhesive tape that easily prevents a temporal change, easily releases air bubbles from the interface with the adherend (air release properties), and is capable of maintaining satisfactory adhesive strength is obtained.

The content of the (meth)acrylic acid alkyl ester may be in a range of 80% by mass to 98.5% by mass or in a range of 90% by mass to 98.5% by mass with respect to the total amount of monomers constituting the acrylic copolymer. Among these, the content of the (meth)acrylic acid alkyl ester having an alkyl group with 4 to 18 carbon atoms may be in the above-described ranges from the viewpoint that the pressure-sensitive adhesive portions are capable of maintaining satisfactory adhesive strength.

As the (meth)acrylic monomer, in addition to those described above, a monomer containing a carboxyl group such as (meth)acrylic acid, itaconic acid, maleic acid, fumaric acid, crotonic acid, or isocrotonic acid, and an anhydride thereof; a monomer containing a sulfonic acid group such as sodium vinyl sulfonate; a monomer containing a cyano group such as acrylonitrile; a monomer containing an amide group such as acrylamide, methacrylamide, N-vinylpyrrolidone, or N,N-dimethyl (meth)acrylamide; a monomer containing a hydroxyl group such as hydroxyalkyl (meth)acrylate or glycerin dimethacrylate; a monomer containing an amino group such as aminoethyl (meth)acrylate or (meth)acryloylmorpholine; a monomer containing an imide group such as cyclohexyl maleimide or isopropyl maleimide; a monomer containing an epoxy group such as glycidyl (meth)acrylate or methyl glycidyl (meth)acrylate; a monomer containing an isocyanate group such as 2-methacryloyloxyethyl isocyanate; and a monomer such as triethylene glycol di(meth)acrylate, diethylene glycol di(meth)acrylate, ethylene glycol di(meth)acrylate, tetraethylene glycol di(meth)acrylate, neopentyl glycol di(meth)acrylate, 1,6-hexanediol di(meth)acrylate, trimethylolpropane tri(meth) acrylate, pentaerythritol tri(meth)acrylate, dipentaerythritol hexa(meth)acrylate, or divinylbenzene can be used alone or in combination of two or more kinds thereof.

Among these, the acrylic polymer may contain a monomer containing a carboxyl group as a monomer component. The content of the monomer containing a carboxyl group may be in a range of 0.2% by mass to 15% by mass, in a range of 0.4% by mass to 10% by mass, or in a range of 0.5% by mass to 6% by mass with respect to the total amount of monomers constituting the acrylic copolymer. When the content of the monomer containing a carboxyl group is in the above-described ranges, the pressure-sensitive adhesive portions can exhibit suitable cohesive power and has satisfactory adhesiveness in the formation of pressure-sensitive adhesive portions.

Further, it is preferable that the acrylic polymer contain a monomer containing a hydroxyl group as a monomer component. The content of the monomer containing a hydroxyl group may be in a range of 0.01% by mass to 1.0% by mass or in a range of 0.03% by mass to 0.3% by mass with respect to the total amount of monomers constituting the acrylic copolymer. When the content of the monomer containing a hydroxyl group is in the above-described ranges, the pressure-sensitive adhesive portions formed of the pressure-sensitive adhesive composition can exhibit satisfactory pressure-sensitive adhesiveness, and the viscosity can be improved without impairing the coating properties and the printing properties of the pressure-sensitive adhesive composition.

Further, in addition to the (meth)acrylic monomer described above, aromatic vinyl compounds such as styrene and substituted styrene; olefins such as ethylene propylene, and butadiene; vinyl esters such as vinyl acetate; and vinyl chloride can also be used as the monomer.

The acrylic polymer can be produced by polymerizing the monomer using a method such as a solution polymerization method, a bulk polymerization method, a suspension polymerization method, or an emulsion polymerization method, and it is preferable that the solution polymerization method be employed from the viewpoint of improving the production efficiency of the acrylic polymer.

Examples of the solution polymerization method may include a method of mixing the monomer, a polymerization initiator, and an organic solvent in a temperature range of 40° C. to 90° C., stirring the mixture, and radically polymerizing the mixture.

As the polymerization initiator, for example, a peroxide such as benzoyl peroxide or lauryl peroxide, an azo-based thermal polymerization initiator such as azobisisobutylnitrile, and a photopolymerization initiator such as an acetophenone-based photopolymerization initiator, a benzoin ether-based photopolymerization initiator, a benzyl ketal-based photopolymerization initiator, an acyl phosphine oxide-based photopolymerization initiator, a benzoin-based photopolymerization initiator, or a benzophenone-based photopolymerization initiator can be used.

The acrylic polymer obtained by the method may be in a state of being dissolved or dispersed in an organic solvent, for example, in a case where the acrylic polymer is produced by the solution polymerization method.

As the acrylic polymer obtained by the method described above, an acrylic polymer having a weight-average molecular weight of 300,000 to 1,200,000 is preferable, an acrylic polymer having a weight-average molecular weight of 400,000 to 1,100,000 is more preferable, and an acrylic polymer having a weight-average molecular weight of 500,000 to 1,000,000 is still more preferable from the viewpoint of obtaining patterned pressure-sensitive adhesive tape that has a reduced thickness and more excellent adhesive strength and easily removes air bubbles.

Further, the weight-average molecular weight is a value measured by a gel permeation chromatography method (GPC method) and calculated in terms of standard polystyrene. Specifically, the weight-average molecular weight can be measured under the following conditions using a GPC device (HLC-8329GPC, manufactured by Tosoh Corporation).

Sample concentration: 0.5% by mass (tetrahydrofuran solution)
Sample injection volume: 100 μl
Eluent: tetrahydrofuran
Flow rate: 1.0 ml/min
Measurement temperature: 40° C.
Main column: two columns of TSKgel GMHHR-H (20)
Guard column: TSKgel HXL-H
Detector: differential refractometer
Weight-average molecular weight of standard polystyrene: 10,000 to 20,000,000 (manufactured by Tosoh Corporation)

As the pressure-sensitive adhesive composition according to one or more embodiments, a pressure-sensitive adhesive composition containing a tackifying resin may be used from the viewpoint of forming the pressure-sensitive adhesive portions having more excellent adhesive strength, tensile strength, and tensile breaking strength.

As the tackifying resin, for example, a rosin-based tackifying resin, a polymerized rosin-based tackifying resin, a polymerized rosin ester-based tackifying resin, a rosin phenol-based tackifying resin, a stabilized rosin ester-based tackifying resin, a disproportionated rosin ester-based tackifying resin, a hydrogenated rosin ester-based tackifying resin, a terpene-based tackifying resin, a terpene phenol-based tackifying resin, and a petroleum resin-based tackifying resin such as a styrene-based tackifying resin can be used.

From the viewpoint of obtaining patterned pressure-sensitive adhesive tape that has a reduced thickness and more excellent adhesive strength and easily removes air bubbles, it is preferable to use a rosin-based tackifying resin and a petroleum resin-based tackifying resin in combination as the tackifying resin. It is preferable to use the rosin-based tackifying resin and the petroleum resin-based tackifying resin in combination with the acrylic polymer and more preferable to use the rosin-based tackifying resin and the petroleum resin-based tackifying resin in combination with an acrylic polymer obtained by polymerizing a monomer containing butyl (meth)acrylate from the viewpoint of obtaining patterned pressure-sensitive adhesive tape that has a reduced thickness and more excellent adhesive strength and easily removes air bubbles.

Further, from the viewpoint of further improving the initial adhesive strength of the pressure-sensitive adhesive portions (B), it is preferable to use a tackifying resin in a liquid state at room temperature as the tackifying resin. Examples of the tackifying resin in a liquid state at room temperature include process oil, a polyester-based plasticizer, and low-molecular weight liquid rubber such as polybutene, a terpene phenol resin can be used as the tackifying resin, and examples of a commercially available product of the terpene phenol resin include YP-90L (manufactured by Yasuhara Chemical Co., Ltd.).

The content of the tackifying resin to be used may be in a range of 20 parts by mass to 60 parts by mass or in a range of 30 parts by mass to 55 parts by mass with respect to 100 parts by mass of the acrylic polymer from the viewpoint of obtaining patterned pressure-sensitive adhesive tape having more excellent adhesive strength.

Further, a pressure-sensitive adhesive composition containing a softener, a plasticizer, a filler, an anti-aging agent, a colorant, and the like as necessary in addition to the acrylic polymer or the like can be used as the pressure-sensitive adhesive composition constituting the pressure-sensitive adhesive portions (B).

Further, it is preferable to use a crosslinking agent from the viewpoint that the gel fraction of the pressure-sensitive adhesive portions (B) can be adjusted to be in a suitable range, and as a result, the shape of the pressure-sensitive adhesive portions (B) is likely to be maintained, and thus patterned pressure-sensitive adhesive tape that easily prevents a temporal change, easily releases air bubbles from the interface between the adherend and the pressure-sensitive adhesive portions (B), and has excellent adhesive strength is obtained.

It is preferable to use an isocyanate crosslinking agent or an epoxy crosslinking agent as the crosslinking agent.

As the isocyanate crosslinking agent, for example, tolylene diisocyanate, naphthylene-1,5-diisocyanate, hexamethylene diisocyanate, diphenylmethane diisocyanate, xylylene diisocyanate, or trimethylolpropane-modified tolylene diisocyanate can be used. Among these, a tolylene diisocyanate adduct such as tolylene diisocyanate or trimethylolpropane-modified tolylene diisocyanate may be used. The toluene diisocyanate adduct has a structure derived from toluene diisocyanate in a molecule, and examples of a commercially available product include CORONATE L (manufactured by Nippon Polyurethane Industry Co., Ltd.).

When the isocyanate crosslinking agent is used, it is preferable to use an acrylic polymer containing a hydroxyl group as the acrylic polymer. As the monomer used for producing the acrylic polymer containing a hydroxyl group, for example, 2-hydroxyethyl (meth)acrylate, 4-hydroxybutyl (meth)acrylate, or 6-hydroxyhexyl (meth)acrylate can be used, and 2-hydroxyethyl (meth)acrylate or 4-hydroxybutyl (meth)acrylate may be used.

Further, for example, TETRAD X or TETRAD C (manufactured by Mitsubishi Gas Chemical Company, Inc.), or E-05X (manufactured by Soken Chemical & Engineering Co., Ltd.) can be used as the epoxy crosslinking agent.

When the epoxy crosslinking agent is used, an acrylic polymer containing an acid group may be used as the acrylic polymer. As the monomer used for producing the acrylic polymer containing an acid group, for example, (meth) acrylic acid, an acrylic acid dimer, itaconic acid, crotonic acid, maleic acid, or maleic anhydride may be used, or (meth)acrylic acid may be used.

As the pressure-sensitive adhesive composition according to one or more embodiments, a pressure-sensitive adhesive composition containing a solvent as necessary may be used. The pressure-sensitive adhesive composition can be selected depending on a method of forming the pressure-sensitive adhesive portions, and a pressure-sensitive adhesive composition having a shear viscosity adjusted to be in a range of 125 mPa·s to 1,625 mPa·s can be used, a pressure-sensitive adhesive composition having a shear viscosity adjusted to be in a range of 400 mPa·s to 1,200 mPa·s may be used, and a pressure-sensitive adhesive composition having a shear viscosity adjusted to be in a range of 500 mPa·s to 1,000 mPa·s may be used from the viewpoint of easily forming the pressure-sensitive adhesive portions (B) having a predetermined shape.

When the gravure printing method is used as the method of forming the pressure-sensitive adhesive portions in the method of forming the patterned pressure-sensitive adhesive tape using the pressure-sensitive adhesive composition according to one or more embodiments, a pressure-sensitive adhesive composition having a shear viscosity adjusted to be in a range of 125 mPa·s to 1,500 mPa·s can be used as the pressure-sensitive adhesive composition. Further, a pressure-sensitive adhesive composition having a shear viscosity adjusted to be in a range of 125 mPa·s to 520 mPa·s may be used, and a pressure-sensitive adhesive composition having a shear viscosity adjusted to be in a range of 140 mPa·s to 200 mPa·s may be used from the viewpoint that the transferability of the pressure-sensitive adhesive composition from a printing plate is satisfactory and the pressure-sensitive adhesive portions (B) having a predetermined shape are easily formed.

Further, when the screen printing method is used as the method of forming the pressure-sensitive adhesive portions in the method of forming the patterned pressure-sensitive adhesive tape using the pressure-sensitive adhesive composition according to one or more embodiments, a pressure-sensitive adhesive composition having a shear viscosity adjusted to be in a range of 500 mPa·s to 1,625 mPa·s can be used as the pressure-sensitive adhesive composition, a pressure-sensitive adhesive composition having a shear viscosity adjusted to be in a range of 1,000 mPa·s to 1,625 mPa·s may be used, and a pressure-sensitive adhesive composition having a shear viscosity adjusted to be in a range of 1,200 mPa·s to 1,625 mPa·s may be used from the viewpoint that the transferability of the pressure-sensitive adhesive composition from a printing plate is satisfactory and the pressure-sensitive adhesive portions (B) having a predetermined shape are easily formed.

The non-volatile content in the pressure-sensitive adhesive composition according to one or more embodiments is not particularly limited as long as a desired elongational viscosity and/or a desired Trouton's ratio is obtained, but may be 15% by mass or greater, 20% by mass or greater, or 25% by mass or greater. Further, the non-volatile content described above may be less than 40% by mass, 38% by mass or less, or 35% by mass or less. When the non-volatile content in the pressure-sensitive adhesive composition is set to be in the above-described ranges, the suitability (transferability of the pressure-sensitive adhesive composition from a printing plate, the shape holding properties of the pressure-sensitive adhesive portions after transfer, and the like) for various printing methods of forming the pressure-sensitive adhesive portions is excellent.

(Patterned Pressure-Sensitive Adhesive Tape)

The patterned pressure-sensitive adhesive tape according to one or more embodiments of the present invention (hereinafter, also referred to as pressure-sensitive adhesive tape according to one or more embodiments) includes a support (A) and a pressure-sensitive adhesive layer, and the pressure-sensitive adhesive layer has two or more pressure-sensitive adhesive portions (B) and a non-pressure-sensitive adhesive portion region having no pressure-sensitive adhesive portions (B) between the two or more pressure-sensitive adhesive portions (B). The non-pressure-sensitive adhesive portion region is patterned to lead to an outer periphery of a sheet plane.

Specific examples of the embodiment of the pressure-sensitive adhesive tape according to one or more embodiments include patterned pressure-sensitive adhesive tape having two or more pressure-sensitive adhesive portions (B) directly on a side of at least one surface (a) of the support (A) and patterned pressure-sensitive adhesive tape having the pressure-sensitive adhesive portions (B) on a side of at least one surface (a) of the support (A) via another layer.

When double-sided patterned pressure-sensitive adhesive tape is used as the pressure-sensitive adhesive tape according to one or more embodiments, double-sided pressure-sensitive adhesive tape having a configuration in which two or more of the specific pressure-sensitive adhesive portions (B) are provided on sides of both surfaces (a) of the support (A), a region having no pressure-sensitive adhesive portions (B) is present between the two or more pressure-sensitive adhesive portions (B), and the region leads to an end portion of the patterned pressure-sensitive adhesive tape or patterned pressure-sensitive adhesive tape having a configuration in which two or more of the specific pressure-sensitive adhesive portions (B) are provided on a side of one surface (a) of the support (A), a region having no pressure-sensitive adhesive portions (B) is present between the two or more pressure-sensitive adhesive portions (B), the region leads to an end portion of the patterned pressure-sensitive adhesive tape, and a pressure-sensitive adhesive layer is provided on a side of the other entire surface of the support (A) can be used.

The non-pressure-sensitive adhesive portion region having no pressure-sensitive adhesive portions (B) between the two or more of the pressure-sensitive adhesive portions (B) is a region where components constituting the pressure-sensitive adhesive portions (B) are not present or such components may be present to the extent that the pressure-sensitive adhesiveness is not exhibited. Therefore, when the pressure-sensitive adhesive tape according to one or more embodiments is observed in a side surface direction, the pressure-sensitive adhesive portions (B) are observed to be formed in a convex shape with respect to the surface (a) of the support (A).

Further, the pressure-sensitive adhesive tape according to one or more embodiments has a configuration in which the region having no pressure-sensitive adhesive portions (B) between the two or more pressure-sensitive adhesive portions (B) leads to a part of an end portion (outer edge portion) of the patterned pressure-sensitive adhesive tape. When the patterned pressure-sensitive adhesive tape having the above-described configuration is used, since air bubbles are released to the outside from the interface between the patterned pressure-sensitive adhesive tape and the adherend through the region in a case of attaching the patterned pressure-sensitive adhesive tape to the adhered, appearance defects caused by swelling or the like of the patterned pressure-sensitive adhesive tape can be prevented, and excellent thermal conductivity, adhesiveness, and the like can be maintained.

The total thickness of the pressure-sensitive adhesive tape according to one or more embodiments to be used may be 50 μm or less, 20 μm or less, in a range of 2 μm to 15 μm, in a range of 3 μm to 10 μm, or in a range of 3 μm to 6 μm from the viewpoint of contributing to reduction of the thickness of mobile electronic terminals and the like. When the support (A) of the pressure-sensitive adhesive tape according to one or more embodiments includes a foam sheet, the total thickness of the pressure-sensitive adhesive tape according to one or more embodiments may be 300 μm or less, in a range of 30 μm to 250 μm, in a range of 50 μm to 200 μm, or in a range of 50 μm to 100 μm from the viewpoint of contributing to reduction of the thickness of mobile electronic terminals and the like. The pressure-sensitive adhesive tape according to one or more embodiments has an excellent property of releasing air bubbles and excellent adhesive strength and thermal conductivity even when the pressure-sensitive adhesive tape is extremely thin as described above. Further, the total thickness of the patterned pressure-sensitive adhesive tape denotes the thickness of the patterned pressure-sensitive adhesive tape measured by a method of using a dial gauge in conformity with JIS K 6783 under conditions of the dial gauge having a flat contact surface with a diameter of 5 mm and a load of 1.23 N, and does not include the thickness of the release liner. The above-described thickness can be measured, for example, with a thickness meter TH-102 (manufactured by Tester Sangyo Co., Ltd.).

The adhesive strength (180° peel adhesion strength) of the pressure-sensitive adhesive tape according to one or more embodiments to be used may be in a range of 1 N/20 mm to 12 N/20 mm, in a range of 1.5 N/20 mm to 10 N/20 mm, or in a range of 3 N/20 mm to 8 N/20 mm from the viewpoint of obtaining the patterned pressure-sensitive adhesive tape that easily releases air bubbles from the interface with the adherend and having excellent adhesive strength even when the patterned pressure-sensitive adhesive tape has a reduced thickness. When more excellent adhesiveness is required, the adhesive strength of the patterned pressure-sensitive adhesive tape to be used may be in a range of 4 N/20 mm to 10 N/20 mm or in a range of 4.5 N/20 mm to 8 N/20 mm.

Further, the adhesive strength (180° peel adhesion strength) denotes a value measured in conformity with JIS Z 0237. Specifically, the adhesive strength is a value measured by overlapping the surface having the pressure-sensitive adhesive portions (B) of the patterned pressure-sensitive adhesive tape lined with a polyethylene terephthalate film having a thickness of 25 μm with a clan and smooth stainless steel plate (BA plate), allowing a 2 kg roller to reciprocate once on the upper surface thereof so that the upper surface is pressurized, allowing the surface to stand for 1 hour or 24 hours under conditions of 23° C. and 50% RH, and peeling off the patterned pressure-sensitive adhesive tape in a direction of 180° at a speed of 0.3 m/min. Further, the lining is performed not on the surface having the pressure-sensitive adhesive portions (B) serving as a constituent element of one or more embodiments of the present invention but on the surface having no pressure-sensitive adhesive portions (B). Further, when the patterned pressure-sensitive adhesive tape has the pressure-sensitive adhesive portions (B) on both surfaces thereof, any one of the surfaces having the pressure-sensitive adhesive portions (B) is lined.

From the viewpoint of preventing peeling over time and falling off of components due to repulsive power or the like of the adherend or the support (A) even when the pressure-sensitive adhesive tape has a reduced thickness and preventing peeling and the like even when the pressure-sensitive adhesive tape is used at a relatively high temperature, the adhesive holding strength of the pressure-sensitive adhesive tape according to one or more embodiments to be used may be 2 mm or less, 0.5 mm or less, or 0.1 mm or less.

Further, the adhesive holding strength denotes a value measured in conformity with JIS Z 0237. Specifically, the adhesive holding strength is a value obtained by overlapping the surface having the pressure-sensitive adhesive portions (B) of the patterned pressure-sensitive adhesive tape lined with aluminum foil having a thickness of 50 μm with a clean and smooth stainless steel plate (hairline), allowing a 2 kg roller to reciprocate once on the upper surface thereof so that the upper surface is pressurized, allowing the surface to stand for 1 hour under conditions of 23° C. and 50% RH to obtain a test piece, fixing the stainless steel plate constituting the test piece in the vertical direction in an environment of 100° C., allowing the patterned pressure-sensitive adhesive tape constituting the test piece to stand for 24 hours in a state of applying a load of 100 g to the lower end portion of the patterned pressure-sensitive adhesive tape, and measuring the displacement distance between the stainless steel plate and the patterned pressure-sensitive adhesive tape with a vernier caliper.

Support (A)

The thickness of the support (A) constituting the pressure-sensitive adhesive tape according to one or more embodiments can be appropriately set according to the type of the support (A), and may be in a range of 1 μm to 20 μm, in a range of 1 μm to 10 μm, in a range of 1 μm to 4 μm, or in a range of 1.5 μm to 2.5 μm when the support (A) is a resin film. Further, when the support (A) is a foam sheet, the thickness thereof may be 250 μm or less, in a range of 30 μm to 200 μm, or in a range of 50 μm to 100 μm. When the thickness of the support (A) is set to be in the above-described range, the patterned pressure-sensitive adhesive tape can be thinned, air bubbles can be easily removed from the interface between the surface having the pressure-sensitive adhesive portions (B) and the adherend, and as a result, appearance defects caused by swelling and the like of the patterned pressure-sensitive adhesive tape and degradation of the performance such as the thermal conductivity or the adhesive strength can be effectively prevented.

For example, a sheet-like support obtained by using a resin can be used as the support (A). Specific examples of the sheet-like support (A) obtained by using a resin include a non-foamed resin film and a foam sheet.

As the resin that can be used for producing the support (A), polyester such as polyethylene terephthalate (PET), polyethylene naphthalate (PEN), or polybutylene terephthalate (PBT), an amide-based resin such as polyamide (nylon) or wholly aromatic polyamide (aramid), an acrylic resin such as polybutyl acrylate, polyethyl acrylate, or polymethyl methacrylate (PMMA), a styrene-based resin such as polystyrene, an acrylonitrile-styrene copolymer (AS resin), or an acrylonitrile-butadiene-styrene copolymer (ABS resin), polyether ketone such as polyether ether ketone (PEEK) or polyether ketone ketone, polyether sulfone (PES), polysulfone, polyvinyl chloride (PVC), polyphenylene sulfide (PPS), polyimide (PI), polyamideimide, polyether imide (PEI), polyester imide, polycarbonate (PC), polyacetal, polyarylene ether (such as polyphenylene ether), polyphenylene sulfide, polyarylate, polyaryl, polyurethane, an epoxy-based resin, a rubber-based resin, and an elastomer can be used alone or in combination of two or more kinds thereof.

Among these, from the viewpoints of a less variation in thickness, excellent tensile strength and workability, and being economical (cost), it is preferable to use a polyester film and more preferable to use a polyethylene terephthalate film as the support (A). It is preferable that a biaxially stretched polyester film be used as the polyester film from the viewpoint of further increasing the strength of the patterned pressure-sensitive adhesive tape obtained by using the support (A) and the polyester film.

The support (A) can be produced by molding the resin in a sheet shape. A known method such as a melt extrusion method can be used as the method of molding the resin in a sheet shape. When the support (A) is a resin film, the resin film may be stretched or unstretched.

The support (A) may be formed of a single layer or a plurality of layers formed of resins, which are the same as or different from each other. For example, the support (A) may be a laminate of a resin film (A1) and a foam sheet (A2). When the support (A) is a laminate of the resin film (A1) and the foam sheet (A2), it is preferable that the pressure-sensitive adhesive portions be provided on one surface of the resin film (A1) and the foam sheet (A2) be provided on the other surface thereof.

That is, the pressure-sensitive adhesive tape according to one or more embodiments may have at least a structure in which the pressure-sensitive adhesive portions (B) are provided on one surface (a) of the support (A) that is the resin film (A1) or at least a structure in which the pressure-sensitive adhesive portions (B) are provided on one surface (a) of the support (A) that is the foam sheet (A2). Further, the pressure-sensitive adhesive tape according to one or more embodiments may be at least a structure in which the pressure-sensitive adhesive portions (B) are provided, for example, on the surface of the resin film (A1) of the laminate having the resin film (A1) and the foam sheet (A2).

Further, from the viewpoint of further enhancing the adhesiveness and the like between the pressure-sensitive adhesive portions (B) and other pressure-sensitive adhesive layers, for example, a support obtained by performing an oxidation treatment such as a chromic acid treatment, an ozone exposure treatment, a flame exposure treatment, a high-voltage electrical-shock exposure treatment, or an ionizing radiation treatment on one surface or both surfaces thereof or a support obtained by forming a primer layer or the like using a coating agent or the like can be used as the support (A).

Pressure-Sensitive Adhesive Portions (B)

Next, the pressure-sensitive adhesive portions (B) constituting the pressure-sensitive adhesive tape according to one or more embodiments will be described.

The pressure-sensitive adhesive portions (B) are provided on one surface or both surfaces of the support (A) directly or via another layer as described above.

A region (non-pressure-sensitive adhesive portion region) where components constituting the pressure-sensitive adhesive portions (B) are not present or may be present to the extent that the pressure-sensitive adhesiveness is not exhibited is provided between the two or more pressure-sensitive adhesive portions (B).

Further, the region having no pressure-sensitive adhesive portions (B) between the two or more pressure-sensitive adhesive portions (B) is configured to lead to a part of an end portion (outer edge portion) of the patterned pressure-sensitive adhesive tape. When the patterned pressure-sensitive adhesive tape having the above-described configuration is used, since air bubbles can be easily removed from the interface between the patterned pressure-sensitive adhesive tape and the adherend in a case of attaching the patterned pressure-sensitive adhesive tape to the adhered, appearance defects caused by swelling or the like of the patterned pressure-sensitive adhesive tape can be prevented, and excellent thermal conductivity, adhesiveness, and the like can be maintained.

Figure 2:
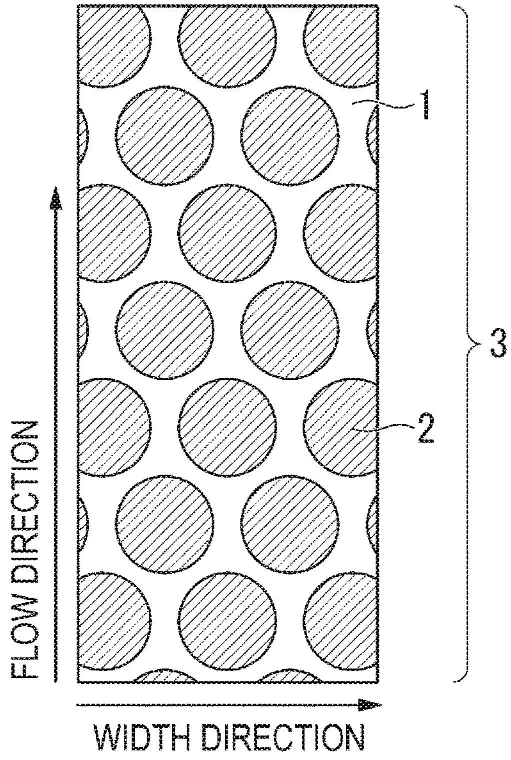
FIG. 2 is a top view showing patterned pressure-sensitive adhesive tape that has pressure-sensitive adhesive portions in a substantially circular shape when viewed from a side of the pressure-sensitive adhesive portions.
Figure 3:
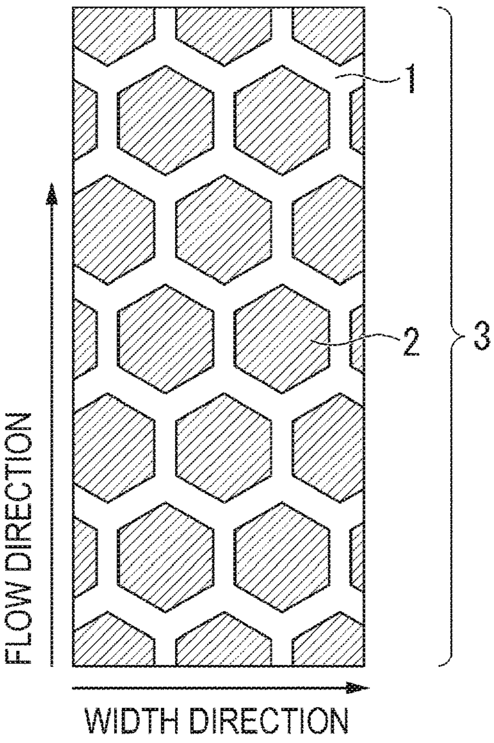
FIG. 3 is a top view showing patterned pressure-sensitive adhesive tape that has pressure-sensitive adhesive portions in a substantially hexagonal shape when viewed from a side of the pressure-sensitive adhesive portions.
Figure 4:
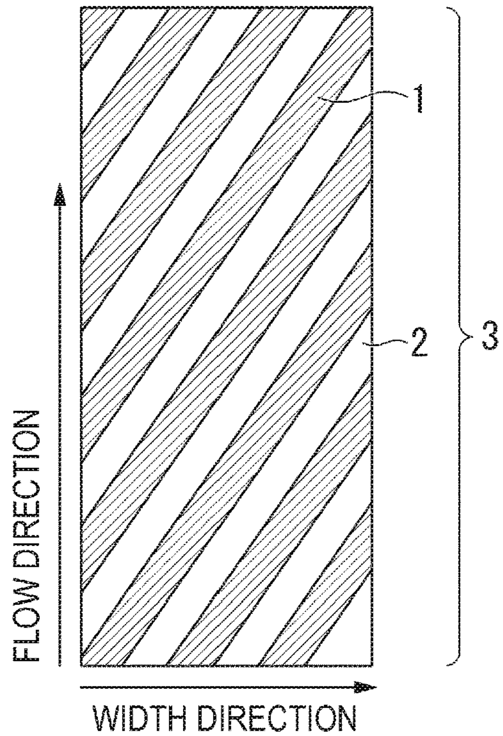
FIG. 4 is a top view showing patterned pressure-sensitive adhesive tape that has pressure-sensitive adhesive portions in a substantially line shape when viewed from a side of the pressure-sensitive adhesive portions.

The pressure-sensitive adhesive portions (B) can have a substantially quadrilateral shape, a substantially hexagonal shape, or a substantially circular shape when the pressure-sensitive adhesive tape according to one or more embodiments is observed from a side of one surface (a) of the support (A). It is preferable that the pressure-sensitive adhesive portions (B) have a substantially circular shape from the viewpoint of easily releasing air bubbles from the interface between the pressure-sensitive adhesive tape and the adhered (air release properties) and maintaining satisfactory adhesive strength. Examples of the substantially circular shape include the shape shown in FIG. 2. Examples of the substantially hexagonal shape include the shape shown in FIG. 3. The pressure-sensitive adhesive portions having the above-described shape are basically independently provided, but may be partially collected to each other. The pressure-sensitive adhesive portions (B) may be provided in an island shape (dot shape) as shown in FIGS. 1 to 3 or may be provided, for example, in a linear shape as shown in FIG. 4. The pressure-sensitive adhesive portions (B) having a linear shape may extend at an angle at which the pressure-sensitive adhesive portions (B) intersect with an edge positioned in the width direction, may extend at an angle at which the pressure-sensitive adhesive portions (B) intersect with an edge positioned in the flow direction, or may extend at an angle at which the edge positioned in the width direction and the edge positioned in the flow direction intersect with each other. Among examples, it is more preferable that the pressure-sensitive adhesive portions have a substantially quadrilateral shape, a substantially hexagonal shape, or a substantially circular shape in a dot shape (island shape) from the viewpoint that flow paths through which air bubbles are released can be provided in multiple directions.

The substantially circular shape is not particularly limited, but the ratio of the maximum diameter to the minimum diameter [maximum diameter/minimum diameter] of one pressure-sensitive adhesive portion may be in a range of 1 to 4, in a range of 1 to 2, or in a range of 1 to 1.5. Examples of the substantially circular shape include the shape as shown in FIG. 2. The pressure-sensitive adhesive portions having the above-described shape may be basically independently provided, but may be partially connected to each other.

Examples of the substantially quadrilateral shape include shapes such as a substantially square shape, a substantially rectangular shape, a substantially trapezoidal shape, and a substantially rhombus shape. The rhombus shape shown in FIG. 1 is preferable from the viewpoint of easily releasing air bubbles (air release properties) from the interface between the pressure-sensitive adhesive tape and the adherend and maintaining satisfactory adhesive strength.

Further, the concept "substantially" in the substantially quadrilateral shape and the substantially hexagonal shape includes a shape in which the corners of a quadrilateral shape and the corners of a hexagonal shape are rounded and a shape in which linear parts are changed to curved parts when the pressure-sensitive adhesive portions (B) are pressurized in a case where a release liner and the like are attached to the surfaces of the pressure-sensitive adhesive portions (B) or the patterned pressure-sensitive adhesive tape is wound around a roll.

It is preferable that the corners of the substantially quadrilateral shape have a substantially rhombus shape in which the angle of the corners in the flow direction of the patterned pressure-sensitive adhesive tape is 90° or less. It is more preferable that the angle thereof be in a range of 45° to 90° from the viewpoint of easily releasing air bubbles from the interface (air release properties) between the pressure-sensitive adhesive tape and the adherend and maintaining satisfactory adhesive strength. The substantially rhombus shape in which the angle of the corners is 90° is a substantially square shape.

Further, it is preferable that a pressure-sensitive adhesive portion (b1) and a pressure-sensitive adhesive portion (b2) constituting the two or more pressure-sensitive adhesive portions (B) do not face each other in the flow direction and the width direction of the patterned pressure-sensitive adhesive tape.

Further, the patterned pressure-sensitive adhesive tape is cut into an optional shape and used according to the applications thereof in many cases. Here, when the patterned pressure-sensitive adhesive tape is cut at an optional position by disposing the pressure-sensitive adhesive portion (b1) and the pressure-sensitive adhesive portion (b2) not to face each other in the flow direction and the width direction, the pressure-sensitive adhesive portions (B) are present at a part of the end portion thereof, and thus peeling of the patterned pressure-sensitive adhesive tape can be suppressed.

The distance between the pressure-sensitive adhesive portion (b1) selected from the two or more pressure-sensitive adhesive portions (B) and another pressure-sensitive adhesive portion (b2) adjacent to (closest to) the pressure-sensitive adhesive portion (b1) may be 0.5 mm or less, in a range of 0.05 mm to 0.2 mm, in a range of 0.06 mm to 0.15 mm, or in a range of 0.08 mm to 0.13 mm from the viewpoint of easily releasing air bubbles from the interface between the pressure-sensitive adhesive tape and the adherend (air release properties) and maintaining satisfactory adhesive strength.

Further, when the distance between the pressure-sensitive adhesive portion (b1) and the pressure-sensitive adhesive portion (b2) is set to be in the above-described ranges, the shape of the pressure-sensitive adhesive portions and the shape of the non-pressure-sensitive adhesive portion region are unlikely to be visually recognized, and thus occurrence of appearance defects caused by the shapes of the pressure-sensitive adhesive portions and the non-pressure-sensitive adhesive portion region can be suppressed.

In terms of the size of one pressure-sensitive adhesive portion (b1) selected from the pressure-sensitive adhesive portions (B), the area thereof may be in a range of 0.001 $mm^2$ to 100 $mm^2$, in a range of 0.01 $mm^2$ to 25 $mm^2$, in a range of 0.015 $mm^2$ to 16 $mm^2$, or in a range of 0.02 $mm^2$ to 5 $mm^2$ from the viewpoint of easily releasing air bubbles (air release properties) from the interface between the pressure-sensitive adhesive tape and the adherend and maintaining satisfactory adhesive strength.

Further, when the size of one pressure-sensitive adhesive portion (b1) is set to be in the above-described ranges, the shape of the pressure-sensitive adhesive portions and the shape of the non-pressure-sensitive adhesive portion region are unlikely to be visually recognized, and thus occurrence of appearance defects caused by the shapes of the pressure-sensitive adhesive portions and the non-pressure-sensitive adhesive portion region can be suppressed.

The number of the pressure-sensitive adhesive portions (B) to be present in the area of the patterned pressure-sensitive adhesive tape (a square shape with a size of 5 cm in the flow direction and with a size of 5 cm in the width direction) of one or more embodiments of the present invention may be in a range of 10 to 1,000,000, in a range of 150 to 500,000, in a range of 400 to 100,000, in a range of 1,000 to 50,000, or in a range of 5,000 to 40,000 from the viewpoint of easily releasing air bubbles from the interface (air release properties) between the patterned pressure-sensitive adhesive tape and the adherend and maintaining satisfactory adhesive strength.

Further, when the number of the pressure-sensitive adhesive portions (B) is in the above-described ranges, the shape of the pressure-sensitive adhesive portions and the shape of the non-pressure-sensitive adhesive portion region are unlikely to be visually recognized, and thus occurrence of appearance defects caused by the shapes of the pressure-sensitive adhesive portions and the non-pressure-sensitive adhesive portion region can be suppressed.

Further, from the viewpoint of easily releasing air bubbles from the interface (air release properties) between the patterned pressure-sensitive adhesive tape and the adherend in a case of attachment, maintaining satisfactory adhesive strength, and effectively preventing appearance defects caused by the shape of the pressure-sensitive adhesive portions even when the thickness of the adherend such as a graphite sheet is further reduced, patterned pressure-sensitive adhesive tape having 120 to 2000 pressure-sensitive adhesive portions in a predetermined area thereof (a square shape with a size of 1 cm in the flow direction and with a size of 1 cm in the width direction) is preferable, patterned pressure-sensitive adhesive tape having 280 to 1,600 pressure-sensitive adhesive portions in a predetermined area thereof is more preferable, and patterned pressure-sensitive adhesive tape having 520 to 1,200 pressure-sensitive adhesive portions in a predetermined area thereof is still more preferable as the patterned pressure-sensitive adhesive tape.

Further, the number of the pressure-sensitive adhesive portions can be determined by observing an optional range (a square shape with a size of 1 cm in the flow direction and with a size of 1 cm in the width direction) or an optional range (a square shape with a size of 5 cm in the flow direction and with a size of 5 cm in the width direction) of the patterned pressure-sensitive adhesive tape and counting the number of the pressure-sensitive adhesive portions.

The proportion of the region having the pressure-sensitive adhesive portions (B) in the area of one surface (a) may be in a range of 10% to 99%, in a range of 20% to 90%, in a range of 30% to 80%, or in a range of 35% to 80%. It is particularly preferable that the proportion thereof be in the above-described ranges from the viewpoint of forming pressure-sensitive adhesive portions having a substantially circular shape described below and as a result, efficiently producing patterned pressure-sensitive adhesive tape capable of releasing air bubbles from the interface with the adherend (air release properties) and maintaining satisfactory adhesive strength. Further, the proportion of the region is a proportion of the area of the pressure-sensitive adhesive portions (B) in the area of the tape having a shape with a size of 5 cm in the flow direction and with a size of 5 cm in the width direction.

The thickness of the pressure-sensitive adhesive portions (B) is not particularly limited, but may be in a range of 1 μm to 20 μm, in a range of 2 μm to 15 μm, or in a range of 3 μm to 10 μm from the viewpoint that the patterned pressure-sensitive adhesive tape can have satisfactory adhesive strength, air bubbles can be easily removed from the interface between the adherend and the pressure-sensitive adhesive portions (B), and as a result, appearance defects caused by swelling and the like of the patterned pressure-sensitive adhesive tape and degradation of the performance such as the thermal conductivity, the heat resistance, or the adhesive strength can be effectively prevented. The thickness of the pressure-sensitive adhesive portions (B) denotes the thickness of double-sided patterned pressure-sensitive adhesive tape measured by a method of using a dial gauge in conformity with JIS K 6783 under conditions of the dial gauge having a flat contact surface with a diameter of 5 mm and a load of 1.23 N.

The pressure-sensitive adhesive portions (B) can be formed by using the pressure-sensitive adhesive composition for patterned pressure-sensitive adhesive tape according to one or more embodiments. Among examples of the compositions, it is preferable that pressure-sensitive adhesive portions obtained by using an acrylic pressure-sensitive adhesive composition be used as the pressure-sensitive adhesive portions (B) from the viewpoint of excellent adhesion reliability.

Method of Producing Patterned Pressure-Sensitive Adhesive Tape

The pressure-sensitive adhesive tape according to one or more embodiments can be produced, for example, by intermittently printing (coating) a side of at least one surface (a) of the support (A) with the pressure-sensitive adhesive composition according to one or more embodiments and drying the composition to form the pressure-sensitive adhesive portions (B). Examples of the coating method include a gravure coating method, a comma coating method, a bar coating method, a die coating method, a lip coating method, and a screen coating method.

It is preferable that at least one surface (a) of the support (A) be intermittently coated with the pressure-sensitive adhesive composition, for example, by a printing method such as a gravure printing method or a screen printing method from the viewpoint that the thickness of the pressure-sensitive adhesive portions is likely to be adjusted and the pressure-sensitive adhesive portions are likely to be uniformly formed.

Further, the patterned pressure-sensitive adhesive tape can also be produced by intermittently coating both surface sides of the support (A) with the pressure-sensitive adhesive composition and drying the composition.

Further, the patterned pressure-sensitive adhesive tape can be produced, for example, by intermittently coating the surface of a release liner with the pressure-sensitive adhesive composition, drying the composition to form the pressure-sensitive adhesive portions (B), and transferring the pressure-sensitive adhesive portions (B) to a side of at least one surface (a) of the support (A).

Examples of the method of intermittently coating the support (A) or the release liner with the pressure-sensitive adhesive composition include a gravure coating method, a comma coating method, a bar coating method, a die coating method, a lip coating method, and a screen coating method. Among examples, a method of using a printing plate capable of forming the pressure-sensitive adhesive portions in a desired shape is preferable, and it is preferable that the support (A) or the release liner be intermittently coated with the pressure-sensitive adhesive composition by the gravure printing method (gravure coating method) or the screen printing method (screen coating method) from the viewpoint of easily adjusting the thickness of the pressure-sensitive adhesive portions and easily uniformly forming the pressure-sensitive adhesive portions.

The patterned pressure-sensitive adhesive tape of one or more embodiments of the present invention may be prepared by being produced, for example, using the above-described release liner, releasing the release liner as necessary, and attaching another release liner.

The pressure-sensitive adhesive tape according to one or more embodiments can be suitably used for adhesion between a housing constituting electronic equipment such as a portable electronic terminal and a heat dissipation member such as a graphite sheet or a heat generation member such as a battery charger. The pressure-sensitive adhesive tape according to one or more embodiments can be suitably used in the field of producing electronic equipment such as a portable electronic terminal. Particularly, even when the clearance (site where the patterned pressure-sensitive adhesive tape is attached) between adherends is in an extremely narrow range of 20 μm or less in width, the adherends can firmly adhere to each other.

Further, the patterned pressure-sensitive adhesive tape easily releases air bubbles from the interface between the adherend and the pressure-sensitive adhesive portions (B), and thus can be suitably used for applications of fixing a heat dissipation sheet where there is a concern that the performance is degraded due to remaining of air bubbles or applications of fixing a magnetic sheet.

Use for Applications of Fixing Heat Dissipation Sheet

Electronic equipment such as a portable electronic terminal is equipped with a member that generates heat when used in many cases. Examples of the heat generation member include a battery charger and a circuit board.

It is preferable to avoid an increase in temperature of the electronic equipment partially and locally due to the heat generated by the member by preventing malfunction of the electronic equipment. Therefore, a heat dissipation member such as a heat dissipation sheet is attached to the heat generation member or a member adjacent thereto (for example, a metal member serving as a frame member used for imparting rigidity to electronic equipment) in many cases for the purpose of diffusing the heat.

For example, a graphite sheet or a graphene sheet may be used as the heat dissipation member.

Examples of the graphite sheet include two types of graphite sheets classified into an artificial graphite sheet and a natural graphite sheet.

Examples of the artificial graphite sheet include a pyrolytic graphite sheet obtained by pyrolysis of an organic film such as a polyimide film in an inert gas atmosphere.

Examples of the natural graphite sheet include a graphite sheet obtained by performing an acid treatment on natural graphite and pressing heated and expanded graphite powder into a sheet.

A graphite sheet with less wrinkles is preferable from the viewpoint of exhibiting more excellent heat dissipation properties, and an artificial graphite sheet with less wrinkles is more preferable as the graphite sheet.

The thickness of the graphite sheet may be in a range of 10 μm to 100 μm or in a range of 15 μm to 50 μm from the viewpoint of contributing to reduction of the thickness of electronic equipment such as a portable electronic terminal.

Meanwhile, since the graphite sheet is relatively brittle, the graphite sheet is typically used in a state of a graphite composite sheet in which patterned pressure-sensitive adhesive tape is attached to one surface or both surfaces thereof.

Figure 5:
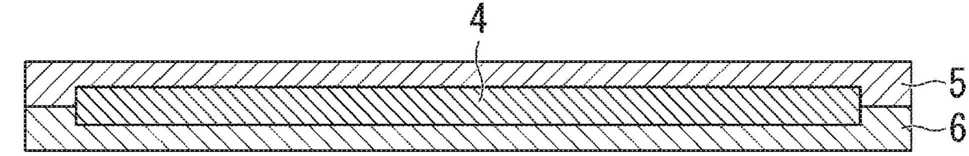
FIG. 5 is a side view showing a graphite composite sheet.

For example, a graphite composite sheet having a configuration in which a graphite sheet 4 is sealed with single-sided patterned pressure-sensitive adhesive tape 5 and double-sided patterned pressure-sensitive adhesive tape 6 as shown in FIG. 5 may be used as the graphite composite sheet from the viewpoint of achieving both high strength and insulating properties of the graphite sheet.

It is preferable that a graphite composite sheet sealed (pouched) with patterned pressure-sensitive adhesive tape having an area greater than the area of the graphite sheet be used as the graphite composite sheet from the viewpoint of preventing occurrence of interlaminar fracture, powder falling, or the like of the graphite sheet and easily realizing suitable workability.

The patterned pressure-sensitive adhesive tape of one or more embodiments of the present invention can be suitably used in a case of pouching the graphite sheet. Here, it is preferable that the patterned pressure-sensitive adhesive tape be used in a state where the surface having the pressure-sensitive adhesive portions (B) faces outward (direction other than the graphite sheet side). In this manner, when a graphite composite sheet and a heat generation member such as a battery charger or a member adjacent to the heat generation member are bonded to each other, it is possible to effectively prevent air bubbles from remaining on the interface therebetween.

The graphite composite sheet and the member can be attached to each other by performing a step of placing the graphite composite sheet on the surface of the member and lightly pressure-bonding the graphite composite sheet and the surface so that the two temporarily adhere to each other and a step of pressing the graphite composite sheet and the member using a roller or the like after the temporary adhesion so that the two firmly adhere to each other. In the step of temporary adhesion, air bubbles are typically present at the interface between the member and the graphite composite sheet. However, air bubbles are quickly removed from the interface when the graphite composite sheet is pressurized using a roller or the like in a case where the graphite composite sheet is formed by using the patterned pressure-sensitive adhesive tape of one or more embodiments of the present invention.

Further, a surface protective film is attached to the graphite composite sheet in many cases for the purpose of preventing damage or the like to the surface thereof. The surface protective film is typically removed after the graphite composite sheet and the member are attached to each other.

When the patterned pressure-sensitive adhesive tape of one or more embodiments of the present invention is used, since the patterned pressure-sensitive adhesive tape can firmly adhere to the adherend such as a member after removal of air bubbles the graphite composite sheet is unlikely to be floated or peeled off from the member in a case where the surface protective film is removed from the graphite composite sheet.

As described above, since the graphite composite sheet obtained by using the patterned pressure-sensitive adhesive tape of one or more embodiments of the present invention is capable of preventing air bubbles from being present at the interface with the adherend such as a member, an increase in thermal resistance value of the patterned pressure-sensitive adhesive tape due to the presence of the air bubbles can be effectively prevented, and as a result, the thermal conductivity of the patterned pressure-sensitive adhesive tape in the thickness direction can be improved.

Use for Applications of Fixing Magnetic Sheet

A magnetic sheet is attached to the inside of electronic equipment in many cases for the purpose of blocking leakage of electromagnetic waves emitted from a member constituting the electronic equipment to the outside and preventing the electromagnetic waves generated outside from affecting the electronic equipment.

A sheet obtained, for example, by using Ni-based ferrite magnetic powder, Mg-based ferrite magnetic powder, Mn-based ferrite magnetic powder, Ba-based ferrite magnetic powder, Sr-based ferrite magnetic powder, Fe—Si alloy powder, Fe—Ni alloy powder, Fe—Co alloy powder, Fe—Si—Al alloy powder, Fe—Si—Cr alloy powder, iron powder, Fe-based amorphous powder, Co-based amorphous powder, Fe-based nanocrystals, or the like can be used as the magnetic sheet.

It is preferable that a relatively thick magnetic sheet be used as the magnetic sheet from the viewpoint of imparting satisfactory electromagnetic shielding properties.

The pressure-sensitive adhesive tape according to one or more embodiments is extremely thin as described above, and thus a magnetic sheet having the maximum film thickness can be used as the magnetic sheet.

It is preferable that the magnetic sheet be used in an aspect of a magnetic composite sheet in which the patterned pressure-sensitive adhesive tape is attached to one surface or both surfaces thereof for the purpose of imparting satisfactory insulating properties and high strength.

EXAMPLES

Hereinafter, examples of one or more embodiments of the present invention will be described in more detail.

Synthesis Example

Production of Acrylic Copolymer

A reaction container provided with a stirrer, a reflux cooling pipe, a nitrogen introduction pipe, and a thermometer was charged with 74.9 parts by mass of n-butyl acrylate, 10 parts by mass of 2-ethylhexyl acrylate, 10 parts by mass of cyclohexyl acrylate, 5 parts by mass of acrylic acid, 0.1 parts by mass of 4-hydroxybutyl acrylate, and 100 parts by mass of ethyl acetate and heated to 75° C. while nitrogen was blown into the container.

Next, a solution obtained by dissolving 0.1 parts by mass of 2,2'-azobis(2-methylbutyronitrile) in ethyl acetate in advance was added to the mixture, and the mixture was allowed to stand at 75° C. for 8 hours while being stirred.

Next, the mixture was diluted with ethyl acetate and filtered with a 200 mesh metal net, thereby obtaining an acrylic copolymer solution having a non-volatile content of 40% by mass and a weight-average molecular weight of 890,000.

The acrylic polymer had a glass transition temperature of −46.5° C.

Preparation of Pressure-Sensitive Adhesive Composition

Preparation Example 1

5 part by mass of disproportionated rosin glycerin ester (softening point of 125° C.), 15 parts of polymerized rosin pentaerythritol ester (softening point of 125° C.), and 15 parts of an aromatic aliphatic hydrocarbon copolymer resin (trade name "FTR6125", manufactured by Mitsui Petrochemical Industries, Ltd., softening point of 125° C.) with respect to 100 parts by mass of the acrylic copolymer obtained were diluted with ethyl acetate, thereby preparing an acrylic pressure-sensitive adhesive composition having a non-volatile content of 32%. Next, 100 parts of the pressure-sensitive adhesive composition and 1.0 parts of an isocyanate-based crosslinking agent (trade name "NC40", manufactured by DIC Corporation) were added to the prepared composition, and the mixture was stirred and mixed, thereby preparing a pressure-sensitive adhesive composition (a-1).

The elongational viscosity, the shear viscosity, and the Trouton's ratio of the pressure-sensitive adhesive composition (a-1) were evaluated by the above-described evaluation method. The results are listed in Table 1.

Preparation of Pressure-Sensitive Adhesive Composition

Preparation Examples 2 to 6 and Comparative Preparation Examples 1 to 3

Pressure-sensitive adhesive compositions (a-1) to (a-6) and (b-1) to (b-3) were prepared by the same method as in Preparation Example 1 except that the mixture is diluted with ethyl acetate and an acrylic pressure-sensitive adhesive composition having the non-volatile content listed in Table 1 was prepared.

The elongational viscosities, the shear viscosities, and the Trouton's ratios of the pressure-sensitive adhesive compositions (a-1) to (a-6) and (b-1) to (b-3) were evaluated by the same method as in Preparation Example 1. The results are listed in Table 1.

Example 1

"PET25X1J0L" (manufactured by Nippa Co., Ltd., a release liner having a silicone-based release treatment surface on a smooth surface of a PET film) was coated with the pressure-sensitive adhesive composition (a-1) obtained in each preparation example described above using a roll coater and dried at 100° C. for 1 minute, thereby preparing a pressure-sensitive adhesive layer having a thickness of 1 μm.

Next, the pressure-sensitive adhesive layer was transferred to one surface of "K100-2.0W" (manufactured by Mitsubishi Plastics, Inc., polyester film, thickness of 2 μm) serving as a support, thereby obtaining single-sided tape.

Next, the other surface of the support constituting the single-sided tape was coated with the pressure-sensitive adhesive composition (a-1) in the form of dots by the gravure printing method using a gravure coater and a gravure plate (recesses on the plate were dots) having the plate shape listed in Table 1 and dried at 100° C. for 1 minute, thereby obtaining patterned pressure-sensitive adhesive tape having a total thickness of 6 μm and pressure-sensitive adhesive portions with a thickness of 3 μm in a shape (substantially square shape) at an internal angle θ of 90° in the substantially rhombus shape shown in FIG. 1. Further, the distance between an optional pressure-sensitive adhesive portion and a pressure-sensitive adhesive portion adjacent thereto among the pressure-sensitive adhesive portions was 0.1 mm.

Further, the area of the pressure-sensitive adhesive portion (per one portion), the distance between the pressure-sensitive adhesive portion (b1) and the pressure-sensitive adhesive portion (b2) adjacent thereto, and the proportion of the region having the pressure-sensitive adhesive portions were measured by performing observation with an electron microscope (at a magnification of 100 times). These results are listed in Table 2.

"PET25X1J0L" (manufactured by Nippa Co., Ltd., a release liner having a silicone-based release treatment surface on a smooth surface of a PET film) was overlapped with the surface having the pressure-sensitive adhesive portions of the patterned pressure-sensitive adhesive tape obtained above and attached to each other at a line pressure of 3 N/mm using a laminator.

Examples 2 to 4 and Comparative Example 1 and 2

Each patterned pressure-sensitive adhesive tape in Examples 2 to 4 and Comparative Examples 1 and 2 was obtained by the same method as in Example 1 except that the pressure-sensitive adhesive compositions (a-2) to (a-4), (b-1), and (b-2) obtained in Preparation Examples 2 to 4 and Comparative Preparation Examples 1 and 2 were respectively used. The obtained patterned pressure-sensitive adhesive tape was evaluated by the same method as in Example 1, and the results are listed in Table 2. Further, in Comparative Example 2, the pressure-sensitive adhesive composition transferred to the support from the plate by the gravure printing method flowed, the pressure-sensitive adhesive portions were not formed dots, and thus the patterned pressure-sensitive adhesive tape was not obtained.

Example 5

Patterned pressure-sensitive adhesive tape of Example 5 was obtained by the same method as in Example 1 except that a screen coater and a screen plate (holes of the plate were dots) having the plate shape listed in Table 1 were used, and the support was coated with the pressure-sensitive adhesive composition (a-5) obtained in Preparation Example 5 in the form of dots using the screen printing method. The obtained patterned pressure-sensitive adhesive tape was evaluated by the same method as in Example 1, and the results are listed in Table 2.

Example 6 and Comparative Example 3

Each patterned pressure-sensitive adhesive tape of Example 6 and comparative Example 3 was obtained by the same method as in Example 5 except that the pressure-sensitive adhesive compositions (a-6) and (b-3) obtained in Preparation Example 6 and Comparative Preparation Example 3 were respectively used. The obtained patterned pressure-sensitive adhesive tape was evaluated by the same method as in Example 1, and the results are listed in Table 2. Further, in Comparative Example 3, since the pressure-sensitive adhesive composition flowed from the plate before the support was coated with the pressure-sensitive adhesive composition, screen printing was not performed, and as a result, patterned pressure-sensitive adhesive tape was not formed.

Method of Evaluating Pressure-Sensitive Adhesive Composition Non-Volatile Content The non-volatile content of the pressure-sensitive adhesive composition was calculated from the non-volatile content of the acrylic copolymer and the amount of ethyl acetate used for dilution.

Elongational Viscosity, Shear Viscosity, and Trouton's Ratio

The elongational viscosity at an elongation rate of 4,000 $s^{-1}$, a shear viscosity at a shear rate of 4,000 $s^{-1}$, and the Trouton's ratio therebetween (elongational viscosity/shear viscosity) of each of the pressure-sensitive adhesive compositions (a-1) to (a-6) and (b-1) to (b-3) of Examples 1 to 6 and Comparative Examples 1 to 3 listed in Table 1 using the methods respectively described below.

The elongational viscosity was measured in conformity with the capillary rheometer evaluation method described in JIS-7199 (ISO 11443, ASTM D 3835).

Specifically, a twin capillary type device (RHEOGRAPH 20, manufactured by Gottfert) was used. A capillary dye having a length of 30 mm and a diameter of 0.3 mm and a capillary die having a length of 0.25 mm and a diameter of 0.3 mm were used in combination.

Further, the true shear viscosity was obtained by removing the pressure loss using Bagley correction from the apparent shear viscosity (pressure) measured at a temperature of 30° C. and a shear rate of 1,000 to 300,000 $s^{-1}$. The elongational viscosity corresponding to the elongational rate was determined based on the obtained true shear viscosity and the pressure loss using the Cogswell equation.

The values of the elongational viscosity at an elongation rate of 4,000 $s^{-1}$, the shear viscosity at a shear rate of 4,000 $s^{-1}$, and the Trouton's ratio are listed in Table 1.

Preparation of Graphite Composite Sheet

Single-sided patterned pressure-sensitive adhesive tape "IL-05G" (manufactured by DIC Corporation) having a length of 104 mm, a width of 104 mm, and a thickness of 5 μm was bonded to one surface of a graphite sheet having a length of 100 mm, a width of 100 mm, and a thickness of 25 μm, and the patterned pressure-sensitive adhesive tape obtained in each example and each comparative example was cut into a size of a length of 104 mm and a width of 104 mm and bonded to the other surface of the graphite sheet.

Here, a pressure-sensitive adhesive layer having a smooth surface between the pressure-sensitive adhesive layers constituting the patterned pressure-sensitive adhesive tape was brought into contact with the graphite sheet.

Next, fine pressure-sensitive single-sided tape "CPF50 (25)-SP" (manufactured by Nippa Co., Ltd.) having a thickness of 62 μm was bonded to the surface of the single-sided patterned pressure-sensitive adhesive tape "IL-05G", thereby obtaining a graphite composite sheet.

Method of Evaluating Patterned Pressure-Sensitive Adhesive Tape

Measurement of Pressure-Sensitive Adhesive Layer

The shape, the size, and the like of the pressure-sensitive adhesive portions were measured with an electronic microscope (at a magnification of 100 times).

The thicknesses of the pressure-sensitive adhesive portions, the pressure-sensitive adhesive layer and the pressure-sensitive adhesive tape were measured using a dial gauge (manufactured by Tester Sangyo Co., Ltd.).

Evaluation of Shape of Pressure-Sensitive Adhesive Portions

The area of the pressure-sensitive adhesive portion (per one portion) and the distance between the pressure-sensitive adhesive portion (b1) and the pressure-sensitive adhesive portion (b2) adjacent thereto were measured with an electronic microscope (at a magnification of 100 times). The proportion of the region having the pressure-sensitive adhesive portions was calculated based on the total area of the pressure-sensitive adhesive portions.

Adhesive Strength (1 Hour after Attachment)

The patterned pressure-sensitive adhesive tape obtained in each example and each comparative example was cut to have a width of 20 mm, and the pressure-sensitive adhesive layer on one side of the tape was lined with a polyethylene terephthalate film having a thickness of 25 μm to obtain a test piece. The lining was performed not on the surface of the pressure-sensitive adhesive layer having the pressure-sensitive adhesive portions (B) serving as a constituent element of one or more embodiments of the present invention but on the smooth surface of the pressure-sensitive adhesive layer.

The test piece was attached to the surface of the clean and smooth stainless steel plate, a 2 kg roller was allowed to reciprocate once on the upper surface thereof so that the upper surface was pressurized, the surface was allowed to stand for 1 hour under conditions of 23° C. and 50% RH in conformity with JIS Z-0237, and the peel adhesion strength (release direction: 180°, tension rate: 0.3 m/min) was measured with a Tensilon tension tester in an atmosphere of 23° C. and 50% RH. The measurement results are listed in the columns of "adhesive strength (1 hour after attachment)" in the table.

Adhesive Strength (24 Hours after Attachment)

The patterned pressure-sensitive adhesive tape obtained in each example and each comparative example was cut to have a width of 20 mm, and the pressure-sensitive adhesive layer on one side of the tape was lined with a polyethylene terephthalate film having a thickness of 25 μm to obtain a test piece. The lining was performed not on the surface of the pressure-sensitive adhesive layer having the pressure-sensitive adhesive portions (B) serving as a constituent element of one or more embodiments of the present invention but on the smooth surface of the pressure-sensitive adhesive layer.

The test piece was attached to the surface of the clean and smooth stainless steel plate, a 2 kg roller was allowed to reciprocate once on the upper surface thereof so that the upper surface was pressurized, the surface was allowed to stand for 24 hours under conditions of 23° C. and 50% RH in conformity with JIS Z-0237, and the peel adhesion strength (release direction: 180°, tension rate: 0.3 m/min) was measured with a Tensilon tension tester in an atmosphere of 23° C. and 50% RH. The measurement results are listed in the columns of "adhesive strength (24 hours after attachment)" in the table.

Holding Strength

The patterned pressure-sensitive adhesive tape obtained in each example and each comparative example was cut to have a width of 20 mm, and the pressure-sensitive adhesive layer on one side of the tape was lined with aluminum foil having a thickness of 50 μm to obtain a test piece. The lining was performed not on the surface of the pressure-sensitive adhesive layer having the pressure-sensitive adhesive portions (B) serving as a constituent element of one or more embodiments of the present invention but on the smooth surface of the pressure-sensitive adhesive layer.

The test piece was attached to the clean and smooth surface of the stainless steel plate to have an attachment area of 20 mm×20 mm, a 2 kg roller was allowed to reciprocate once on the upper surface thereof so that the upper surface was pressurized, the surface was allowed to stand for 1 hour under conditions of 23° C. and 50% RH in conformity with JIS Z-0237, a load of 100 g was applied thereto in the shear direction in an atmosphere of 100° C., and the displacement distance of the tape after 24 hours was measured. The measurement results are listed in the columns of "holding strength" in the table.

Method 1 of Evaluating Property of Easily Releasing Air Bubbles (Property of Easily Removing Air Bubbles)

A release liner was released from the graphite composite sheet, and an aluminum plate having a length of 200 mm and a width of 200 mm was placed on the surfaces of the pressure-sensitive adhesive portions in an atmosphere of 23° C. and 50% RH and allowed to stand still for 5 seconds in a state of applying a load of 10 N from above the aluminum plate, thereby obtaining a temporarily attached material.

Next, the temporarily attached material was inverted, a 2 kg roller was allowed to reciprocate once from the surface side of the graphite composite sheet so that the temporarily attached material was pressurized, thereby obtaining a laminate.

Ten laminates were prepared by the above-described method. It was confirmed whether air bubbles were present between the pressure-sensitive adhesive layer of the graphite composite sheet and the aluminum plate constituting the laminate by visually observing swelling of the graphite sheet. The property of easily releasing air bubbles was evaluated based on the number of laminates failed to confirm the presence of air bubbles using the above-described method.

Method 2 of Evaluating Property of Easily Releasing Air Bubbles (Property of Easily Removing Air Bubbles)

"PET25X1J0L" (manufactured by Nippa Co., Ltd., a release liner having a smooth surface subjected to a release treatment, Ra=0.03 μm) was attached to the surfaces of the pressure-sensitive adhesive portions exposed by releasing a release liner of the graphite composite sheet, and the graphite composite sheet was pressurized under a condition of a line pressure of 3 N/mm using a laminator and allowed to stand in an environment of 23° C. for one day.

Thereafter, "PET25X1J0L" was released from the graphite composite sheet, and an aluminum plate having a length of 200 mm and a width of 200 mm was placed on the surfaces of the pressure-sensitive adhesive portions exposed by the release in an atmosphere of 23° C. and 50% RH and allowed to stand still for 5 seconds in a state of applying a load of 10 N from above the aluminum plate, thereby obtaining a temporarily attached material.

Next, the temporarily attached material was inverted, a 2 kg roller was allowed to reciprocate once from the surface side of the graphite composite sheet so that the temporarily attached material was pressurized, thereby obtaining a laminate.

Ten laminates were prepared by the above-described method. It was confirmed whether air bubbles were present between the pressure-sensitive adhesive portions of the graphite composite sheet and the aluminum plate constituting the laminate by visually observing swelling of the graphite sheet. The property of easily releasing air bubbles was evaluated based on the number of laminates failed to confirm the presence of air bubbles using the above-described method.

Presence or Absence of Floating of Graphite Composite Sheet During Release of Fine Pressure-Sensitive Adhesive Film A laminated product obtained by attaching a fine pressure-sensitive adhesive film (obtained by providing a silicone-based fine pressure-sensitive adhesive layer on one surface of a PET film with a thickness of 75 μm; pressure-sensitive adhesive strength=0.05 N/20 mm) to the surface of single-sided patterned pressure-sensitive adhesive tape "IL-05G" (manufactured by DIC Corporation) constituting the graphite composite sheet was placed on an aluminum plate, and the laminated product and the aluminum plate were attached to each other by reciprocating a 2 kg roller once on the surface thereof.

The fine pressure-sensitive adhesive film was released from the surface of the graphite composite sheet in a direction of 180° with respect to the surface at a rate of 5 m/min one minute after the attachment, and it was visually evaluated whether the graphite composite sheet was floated from the surface of the aluminum plate. Ten laminated products were prepared for each of the graphite composite sheets obtained in the examples and the comparative examples, and the above-described test was performed. The number of the laminated products failed to confirm floating of the graphite composite sheet from the surface of the aluminum plate by the test is listed in the following table.

Method of Evaluating Appearance

The graphite composite sheet was attached to an aluminum plate, and the appearance was evaluated based on whether the shape of the pressure-sensitive adhesive portions was visually recognizable when the shape was observed from a position spaced by 30 cm from the upper surface of the graphite composite sheet under a fluorescent lamp. The appearance was evaluated as "A" when the shape of the pressure-sensitive adhesive portions was not visually recognized at all, the appearance was evaluated as "B" when the shape of the pressure-sensitive adhesive portions was gradually and partially recognized visually, and the appearance was evaluated as "C" when the shape of the pressure-sensitive adhesive portions was clearly visually recognized. Further, in Comparative Examples 2 and 3, since the pressure-sensitive adhesive portions were failed to form, the visual recognition of the surface thereof was not made by the above-described method, and thus the evaluation was not performed and "-" is listed in the columns.

[Number of Pressure-Sensitive Adhesive Portions]

The number of pressure-sensitive adhesive portion was determined by observing an optional range of the patterned pressure-sensitive adhesive tape (a square shape with a size of 5 cm in the flow direction and with a size of 5 cm in the width direction) and counting the number of pressure-sensitive adhesive portions.

TABLE 1

| | | Prep-aration Example 1 | Prep-aration Example 2 | Prep-aration Example 3 | Prep-aration Example 4 | Prep-aration Example 5 | Prep-aration Example 6 | Compar-ative Prep-aration Example 1 | Compar-ative Prep-aration Example 2 | Compar-ative Prep-aration Example 3 |
|---|---|---|---|---|---|---|---|---|---|---|
| Pressure-sensitive adhesive composition | Pressure-sensitive adhesive composition No. | a-1 | a-2 | a-3 | a-4 | a-5 | a-6 | b-1 | b-2 | b-3 |
| | Non-volatile content (% by mass) | 32 | 27 | 20 | 16 | 38 | 29 | 40 | 13 | 13 |
| | Elongational viscosity [mPa · s] | 500,000 | 70,000 | 25,000 | 1,500 | 640,000 | 100,000 | 700,000 | 300 | 300 |
| | Shear viscosity [mPa · s] | 1,500 | 500 | 300 | 150 | 1,600 | 600 | 1,700 | 100 | 100 |
| | Trouton's ratio | 333 | 140 | 83 | 10 | 400 | 167 | 412 | 3 | 3 |

TABLE 2

| | | Example 1 | Example 2 | Example 3 | Example 4 | Example 5 |
|---|---|---|---|---|---|---|
| Pressure-sensitive adhesive composition | | a-1 | a-2 | a-3 | a-4 | a-5 |
| Method | | Gravure | Gravure | Gravure | Gravure | Screen |
| Plate shape | Shape of dot | Substantially rhombus (θ = 90°) | Substantially rhombus (θ = 90°) | Substantially rhombus (θ = 90°) | Substantially rhombus (θ = 90°) | Substantially rhombus (θ = 90°) |
| | Area of dot (per one dot) [mm$^2$] | 4 | 4 | 4 | 4 | 4 |
| | Distance between dot (b1) and dot (b2) adjacent thereto [mm] | 0.1 | 0.1 | 0.1 | 0.1 | 0.1 |
| One surface | Shape of pressure-sensitive adhesive portion | Substantialy rhombus (θ = 90°) | Substantially rhombus (θ = 90°) | Substantially rhombus (θ = 90°) | Substantially rhombus (θ = 90°) | Substantially rhombus (θ = 90°) |
| | Area of pressure-sensitive adhesive portion (per one portion) [mm$^2$] | 3.5 | 3.7 | 4 | 4 | 4 |
| | Distance between pressure-sensitive adhesive portion (b1) and pressure-sensitive adhesive porton (b2) adjacent thereto [mm] | 0.3 | 0.2 | 0.1 | 0.1 | 0.1 |
| | Proportion of region having pressure-sensitive adhesive portion [%] | 86 | 91 | 95 | 95 | 95 |
| | Thickness of pressure-sensitive adhesive portion [μm] | 3 | 3 | 3 | 3 | 3 |
| Other surface | Thickness of pressure-sensitive adhesive layer [μm] | 1 | 1 | 1 | 1 | 1 |
| Evaluation results | Total thickness of pressure-sensitive adhesive tape [μm] | 6 | 6 | 6 | 6 | 6 |
| | Adhesive strength (1 hour after attachment) [N/20 mm] | 4.5 | 5 | 5.4 | 5.6 | 6 |
| | Adhesive strength (24 hours after attachment) [N/20 mm] | 5.5 | 6 | 6 | 6 | 7 |
| | Holding strength [mm] | 0 | 0 | 0 | 0 | 0 |
| | Property of easily releasing air bubbles 1 | 10 | 10 | 10 | 10 | 10 |
| | Property of easily releasing air bubbles 2 | 10 | 10 | 10 | 10 | 10 |
| | Difficulty in floating of graphite composite sheet | 10 | 10 | 10 | 10 | 10 |
| | Appearance | A | A | A | A | A |

| | | Example 6 | Comparative Example 1 | Comparative Example 2 | Comparative Example 3 |
|---|---|---|---|---|---|
| Pressure-sensitive adhesive composition | | a-6 | b-1 | b-2 | b-3 |
| Method | | Screen | Gravure | Gravure | Screen |
| Plate shape | Shape of dot | Substantially rhombus (θ = 90°) | Substantially rhombus (θ = 90°) | Substantially rhombus (θ = 90°) | Substantially rhombus (θ = 90°) |
| | Area of dot (per one dot) [mm$^2$] | 4 | 4 | 4 | 4 |
| | Distance between dot (b1) and dot (b2) adjacent thereto [mm] | 0.1 | 0.1 | 0.1 | 0.1 |
| One surface | Shape of pressure-sensitive adhesive portion | Substantially rhombus (θ = 90°) | Substantially rhombus *1 | — *2 | — *2 |
| | Area of pressure-sensitive adhesive portion (per one portion) [mm$^2$] | 4.1 | 2 | — *2 | — *2 |

TABLE 2-continued

| | | | | | |
|---|---|---|---|---|---|
| | Distance between pressure-sensitive adhesive portion (b1) and pressure-sensitive adhesive porton (b2) adjacent thereto [mm] | 0.06 | 0.7 | — *2 | — *2 |
| | Proportion of region having pressure-sensitive adhesive portion [%] | 97 | 67 | 100 | — *2 |
| | Thickness of pressure-sensitive adhesive portion [μm] | 3 | 3 | 2 | — *2 |
| Other surface | Thickness of pressure-sensitive adhesive layer [μm] | 1 | 1 | 1 | — *3 |
| Evaluation results | Total thickness of pressure-sensitive adhesive tape [μm] | 6 | 6 | 5 | — *3 |
| | Adhesive strength (1 hour after attachment) [N/20 mm] | 6.4 | 2 | 4 | — *3 |
| | Adhesive strength (24 hours after attachment) [N/20 mm] | 7.3 | 4 | 5 | — *3 |
| | Holding strength [mm] | 0 | 0 | 0 | — *3 |
| | Property of easily releasing air bubbles 1 | 8 | 10 | 0 | — *3 |
| | Property of easily releasing air bubbles 2 | 8 | 10 | 0 | — *3 |
| | Difficulty in floating of graphite composite sheet | 10 | 7 | 10 | — *3 |
| | Appearance | A | C | — *2 | — *3 |

*1: Close to a circle
*2: Failed to form dots
*3: Fail to prepare tape

In the table, "substantially rhombus (θ=90°)" denotes pressure-sensitive adhesive portions having a rhombus shape in which the angle of corners in the flow direction of the patterned pressure-sensitive adhesive tape was 90° (the angle of corners in the width direction is 90°) (FIG. 1). That is, "substantially rhombus (θ=90°)" in the table denotes a shape (substantially square shape) with an internal corner angle θ of 90° in the shape (substantially rhombus shape) of the pressure-sensitive adhesive portions shown in FIG. 1.

Consideration

The pressure-sensitive adhesive composition in which the elongational viscosity and/or the Trouton's ratio were in predetermined ranges had satisfactory transferability from the printing plate during the production of the patterned pressure-sensitive adhesive tape and thus was capable of forming pressure-sensitive adhesive portions having satisfactory shape accuracy and holding properties. Therefore, the patterned pressure-sensitive adhesive tape of each example had an excellent property of easily releasing air bubbles and had excellent adhesive strength. Further, the patterned pressure-sensitive adhesive tape of each example was unlikely to be floated when attached to the graphite composite sheet.

On the contrary, the pressure-sensitive adhesive composition in which the elongational viscosity and/or the Trouton's ratio were out of the predetermined ranges had degraded transferability from the plate during the production of the patterned pressure-sensitive adhesive tape and degraded shape accuracy and holding properties of the pressure-sensitive adhesive portions after the transfer. Therefore, the pressure-sensitive adhesive tape of each comparative example was difficult to achieve both the property of easily releasing air bubbles and the pressure-sensitive adhesiveness.

More specifically, in Comparative Example 1, since the elongational viscosity and/or the Trouton's ratio of the pressure-sensitive adhesive composition were high, the pressure-sensitive adhesive composition was unlikely to come out of the plate when the pressure-sensitive adhesive composition was transferred to the support from the plate, and thus the transferability was degraded. As a result, the obtained pressure-sensitive adhesive portions had a shape different from the plate shape (dot shape) and thus had small dimensions and degraded shape accuracy. Accordingly, in the patterned pressure-sensitive adhesive tape of Comparative Example 1, since the pressure-sensitive adhesive portions (B) had a shape close to a circle instead of the substantially rhombus shape corresponding to the plate shape (dot shape), the size of the pressure-sensitive adhesive portions (B) was also decreased due to a change in shape after transfer, and thus the proportion of the area was decreased (the contact area with the adherend was decreased). As a result, the patterned pressure-sensitive adhesive tape of Comparative Example 1 failed to have adhesive strength. Further, in the evaluation of whether the graphite composite sheet was floated, the graphite composite sheet obtained by using the patterned pressure-sensitive adhesive tape of Comparative Example 1 was likely to be floated.

In Comparative Example 2, since the elongational viscosity and/or the Trouton's ratio of the pressure-sensitive adhesive composition was low, the pressure-sensitive composition flowed on the support when transferred to the support from the plate, and thus the shape of the pressure-sensitive adhesive portions was not maintained. Therefore, in Comparative Example 2, the shape of the pressure-sensitive adhesive portions (B) was not maintained, and the space between the pressure-sensitive adhesive portions (B) was filled and became sticky (the patterned non-pressure-sensitive adhesive portion region was not formed). As a result, the pressure-sensitive adhesive tape of Comparative Example 2 did not have a path through which air bubbles were released, the property of easily releasing air bubbles was significantly degraded.

In Comparative example 3, since the elongational viscosity and/or the Trouton's ratio of the pressure-sensitive adhesive composition were low, the pressure-sensitive adhesive composition was not maintained on the plate while the pressure-sensitive adhesive composition was placed on the plate and transferred to the support, and thus the pressure-sensitive adhesive portions were not formed on the support.

In Example 6, since the dimensions of the pressure-sensitive adhesive portions (B) were larger than the dimensions of dots, the distance between the pressure-sensitive adhesive portions (B) was reduced, and thus the property of easily releasing air bubbles was more degraded as compared with other examples.

Although the disclosure has been described with respect to only a limited number of embodiments, those skilled in the art, having benefit of this disclosure, will appreciate that various other embodiments may be devised without departing from the scope of the present disclosure. Accordingly, the scope of the invention should be limited only by the attached claims.

What is claimed is:

1. A patterned pressure-sensitive adhesive tape comprising:

a support; and a pressure-sensitive adhesive layer, wherein:

the pressure-sensitive adhesive layer is formed by a pressure-sensitive adhesive composition for a patterned pressure-sensitive adhesive tape, wherein an elongational viscosity of the pressure-sensitive adhesive composition for the patterned pressure-sensitive adhesive tape measured at 30° C. is 1,000 mPa·s or greater and 650,000 mPa·s or less, the pressure-sensitive adhesive layer has two or more pressure-sensitive adhesive portions and a non-pressure-sensitive adhesive portion region having no pressure-sensitive adhesive portions between the two or more pressure-sensitive adhesive portions, the non-pressure-sensitive adhesive portion region is patterned to lead to an outer periphery of a sheet plane, the outer periphery comprises an edge positioned in an width direction of the patterned pressure-sensitive adhesive tape, and an edge positioned in a flow direction of the patterned pressure-sensitive adhesive tape, and a thickness of the pressure-sensitive adhesive portions is in a range of from 1 μm to 20 μm.

2. The patterned pressure-sensitive adhesive tape according to claim 1, wherein the pressure-sensitive adhesive portions when observed from a side of one surface of the support have a substantially circular shape, a substantially quadrilateral shape, or a substantially hexagonal shape.

3. The patterned pressure-sensitive adhesive tape according to claim 1, wherein a distance between any pressure-sensitive adhesive portion selected from the two or more pressure-sensitive adhesive portions and a pressure-sensitive adhesive portion adjacent to the pressure-sensitive adhesive portion is 0.5 mm or less.

4. The patterned pressure-sensitive adhesive tape according to claim 1, wherein a proportion of a region having the pressure-sensitive adhesive portions in an area of one surface of the support is in a range of 10% to 99%.

5. The patterned pressure-sensitive adhesive tape according to claim 1, wherein a 180° peel adhesion strength measured using a test piece obtained by placing a smooth stainless steel plate on a surface having the pressure-sensitive adhesive portions, reciprocating a 2 Kg roller once to pressure-bond the surface and the stainless steel plate to each other, and allowing the surface and the stainless steel plate to stand one hour under conditions of 23° C. and 50% RH is in a range of 1 N/20 mm to 12 N/20mm.

6. A patterned pressure-sensitive adhesive tape comprising:

a support; and a pressure-sensitive adhesive layer, wherein:

the pressure-sensitive adhesive layer is formed by a pressure-sensitive adhesive composition for a patterned pressure-sensitive adhesive tape, wherein a Trouton's ratio of the pressure-sensitive adhesive composition for the patterned pressure-sensitive adhesive tape measured at 30° C. is 8 or greater and 400 or less, the pressure-sensitive adhesive layer has two or more pressure-sensitive adhesive portions and a non-pressure-sensitive adhesive portion region having no pressure-sensitive adhesive portions between the two or more pressure-sensitive adhesive portions, the non-pressure-sensitive adhesive portion region is patterned to lead to an outer periphery of a sheet plane, the outer periphery comprises an edge positioned in an width direction of the patterned pressure-sensitive adhesive tape, and an edge positioned in a flow direction of the patterned pressure-sensitive adhesive tape, and a thickness of the pressure-sensitive adhesive portions is in a range of from 1 μm to 20 μm.

7. The patterned pressure-sensitive adhesive tape according to claim 6, wherein the pressure-sensitive adhesive portions when observed from a side of one surface of the support have a substantially circular shape, a substantially quadrilateral shape, or a substantially hexagonal shape.

8. The patterned pressure-sensitive adhesive tape according to claim 6, wherein a distance between any pressure-sensitive adhesive portion selected from the two or more pressure-sensitive adhesive portions and a pressure-sensitive adhesive portion adjacent to the pressure-sensitive adhesive portion is 0.5 mm or less.

9. The patterned pressure-sensitive adhesive tape according to claim 6, wherein a proportion of a region having the pressure-sensitive adhesive portions in an area of one surface of the support is in a range of 10% to 99%.

10. The patterned pressure-sensitive adhesive tape according to claim 6 wherein a 180° peel adhesion strength measured using a test piece obtained by placing a smooth stainless steel plate on a surface having the pressure-sensitive adhesive portions, reciprocating a 2 Kg roller once to pressure-bond the surface and the stainless steel plate to each other, and allowing the surface and the stainless steel plate to stand one hour under conditions of 23° C. and 50% RH is in a range of 1 N/20 mm to 12 N/20mm.

11. A method of producing the patterned pressure-sensitive adhesive tape according to claim 1, comprising:

a pressure-sensitive adhesive layer forming step of forming the pressure-sensitive adhesive layer on a surface of the support with the pressure-sensitive adhesive composition for the patterned pressure-sensitive adhesive tape.

12. The method of producing the patterned pressure-sensitive adhesive tape according to claim 11, wherein in the pressure-sensitive adhesive layer forming step, two or more of the pressure-sensitive adhesive portions having a substantially circular shape, a substantially quadrilateral shape, or a substantially hexagonal shape are formed by coating at least one surface of the support with the pressure-sensitive adhesive composition for the patterned pressure-sensitive adhesive tape with a gravure printing method or a screen printing method.

13. A method of producing the patterned pressure-sensitive adhesive tape according to claim 6, comprising:

a pressure-sensitive adhesive layer forming step of forming the pressure-sensitive adhesive layer on a surface of the support with the pressure-sensitive adhesive composition for the patterned pressure-sensitive adhesive tape.

14. The method of producing the patterned pressure-sensitive adhesive tape according to claim 13, wherein in the pressure-sensitive adhesive layer forming step, two or more of the pressure-sensitive adhesive portions having a substantially circular shape, a substantially quadrilateral shape, or a substantially hexagonal shape are formed by coating at least one surface of the support with the pressure-sensitive adhesive composition for the patterned pressure-sensitive adhesive tape with a gravure printing method or a screen printing method.

15. The patterned pressure-sensitive adhesive tape according to claim 1, wherein the pressure-sensitive adhesive portions, when observed from a side of one surface of the support, have a substantially circular shape, a substantially rhombus shape, or a substantially hexagonal shape.

16. The patterned pressure-sensitive adhesive tape according to claim 6, wherein the pressure-sensitive adhesive portions, when observed from a side of one surface of the support, have a substantially circular shape, a substantially rhombus shape, or a substantially hexagonal shape.

17. The patterned pressure-sensitive adhesive tape according to claim 1, further comprising a second pressure-sensitive adhesive layer disposed on a side of the support where the pressure-sensitive adhesive layer is not present, wherein the second pressure-sensitive adhesive layer does not comprise a non-pressure-sensitive adhesive portion region.

18. The patterned pressure-sensitive adhesive tape according to claim 17, wherein a thickness of the second pressure-sensitive adhesive layer is lower than the thickness of the pressure-sensitive adhesive portions comprised in the pressure-sensitive adhesive layer.

19. The patterned pressure-sensitive adhesive tape according to claim 1, wherein the support is:

a resin film with a thickness in a range of from 1 μm to 20 μm, or a foam sheet with a thickness of 250 μm or less.

20. The patterned pressure-sensitive adhesive tape according to claim 1, wherein the two or more pressure-sensitive adhesive portions have a convex shape.

* * * * *